(12) United States Patent
Ma et al.

(10) Patent No.: US 9,187,594 B2
(45) Date of Patent: Nov. 17, 2015

(54) NANO-FIBROUS MICROSPHERES AND METHODS FOR MAKING THE SAME

(75) Inventors: Peter X. Ma, Ann Arbor, MI (US); Xiaohua Liu, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 118 days.

(21) Appl. No.: 13/576,731

(22) PCT Filed: Feb. 9, 2011

(86) PCT No.: PCT/US2011/024196
§ 371 (c)(1),
(2), (4) Date: Aug. 2, 2012

(87) PCT Pub. No.: WO2011/100327
PCT Pub. Date: Aug. 18, 2011

(65) Prior Publication Data
US 2012/0308825 A1   Dec. 6, 2012

Related U.S. Application Data

(60) Provisional application No. 61/302,689, filed on Feb. 9, 2010.

(51) Int. Cl.
| | | |
|---|---|---|
| C08G 69/48 | (2006.01) |
| B32B 5/16 | (2006.01) |
| A61K 9/127 | (2006.01) |
| B82Y 40/00 | (2011.01) |
| C08G 63/08 | (2006.01) |
| C08G 73/02 | (2006.01) |
| C08J 3/12 | (2006.01) |
| C08J 9/00 | (2006.01) |
| C08J 9/28 | (2006.01) |

(52) U.S. Cl.
CPC .............. *C08G 63/08* (2013.01); *C08G 73/028* (2013.01); *C08J 3/12* (2013.01); *C08J 9/0071* (2013.01); *C08J 9/283* (2013.01); *C08J 2377/00* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 2007/0014757 A1 | 1/2007 | Chauhan et al. | |
| 2008/0317816 A1* | 12/2008 | Ma et al. | 424/426 |
| 2012/0197060 A1* | 8/2012 | Ray et al. | 600/1 |

OTHER PUBLICATIONS

Jasmine et al. Effect of solvent-controlled aggregation on the intrinsic emission properties of PAMAM dendrimers, Dec. 2008.*
Ahsan, T. et al., "Biomechanics of integrative cartilage repair," Osteoarthritis & Cartilage 7, 29-40 (1999).
Chen, V.J. et al., "Bone regeneration on computer-designed nano-fibrous scaffolds," Biomaterials 27, 3973-3979 (2006).
Hu, J., et al., "Chondrogenic & osteogenic differentiations of human bone marrow-derived mesenchymal stem cells on a nanofibrous scaffold with designed pore network," Biomaterials 30, 5061-5067 (2009).

(Continued)

*Primary Examiner* — Ronak Patel
(74) *Attorney, Agent, or Firm* — Dierker & Associates, P.C.

(57) ABSTRACT

Nano-fibrous microspheres and methods for forming them are disclosed herein. In one embodiment the microsphere includes a plurality of nano-fibers aggregated together in a spherical shape; and a plurality of pores formed between at least some of the plurality of nano-fibers. The nano-fibers are formed of star-shaped polymers.

12 Claims, 34 Drawing Sheets

(56) References Cited

OTHER PUBLICATIONS

Liu, X.H. et al, "Polymeric scaffolds for bone tissue engineering," Annals of Biomedical Engineering 32, 477-486 (2004).

Ma, P.X., "Biomimetic materials for tissue engineering," Advanced Drug Delivery Reviews 60, 184-198 (2008).

Mainil-Varlet, P. et al., "Histological assessment of cartilage repair: a report by the Histology Endpoint Committee of the International Cartilage Repair Society (ICRS)," Journal of Bone & Joint Surgery 85-A, 45-57 (2003).

Roberts, J.C. et al., "Preliminary biological evaluation of polyamidoamine (PAMAM) Starburst(TM) dendrimers," Journal of Biomedical Materials Research 30, 53-65 (1996).

Wang, D.A., et al., "Multifunctional chondroitin sulphate for cartilage tissue-biomaterial integration," Nature Materials 6, 385-392 (2007).

Woo, K.M., et al., "Nano-fibrous scaffolding architecture selectively enhances protein adsorption contributing to cell attachment," Journal Biomedical Materials Research, 67A, 531-537 (2003).

Zhang, Z. et al., "Growth and integration of neocartilage with native cartilage in vitro," Journal of Orthopaedic Research 23, 433-439 (2005).

Zhao, Y.L. et al, "Synthesis & Thermal Properties of Novel Star-Shaped poly(L-lactide)s w/Starburst PAMAM-OH Dendrimer Macroinitiator," Polymer, vol. 43, 2002, pp. 5819-5825.

Cai, Q., et al, Synthesis & Properties of Star-Shaped Polylactide Attached to Poly(Amidoamine) Dendrimer, Biomacromolecules, vol. 4, 2003, pp. 828-834.

Hedden, R.C. et al, "Structure and Dimensions of PAMAM/PEG Dendrimer-Star Polymers," Macromolecules, vol. 36, 2003, pp. 1829-1835.

International Search Report for Application No. PCT/US2011/024196 dated Oct. 31, 2011 (9 pages).

* cited by examiner

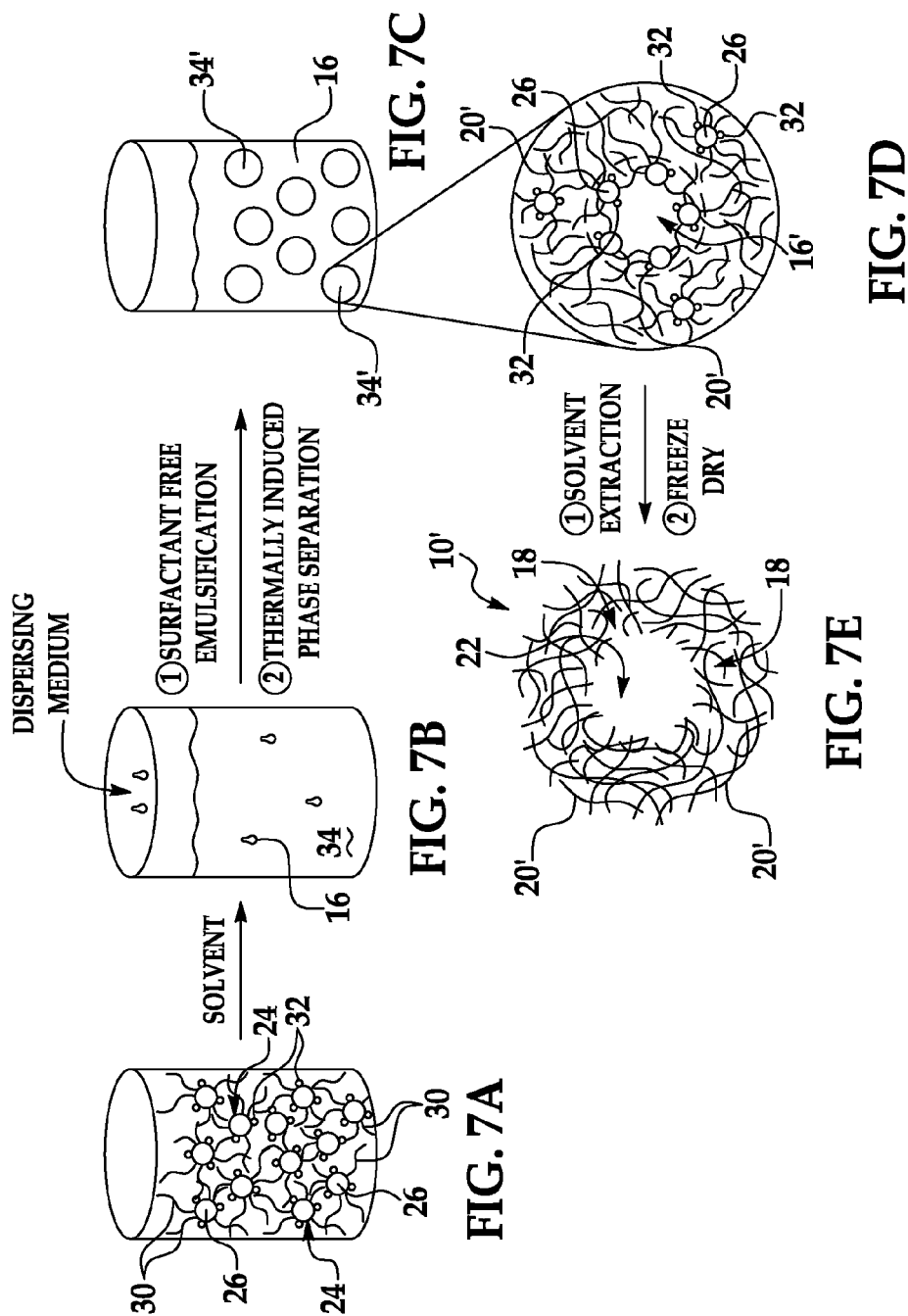

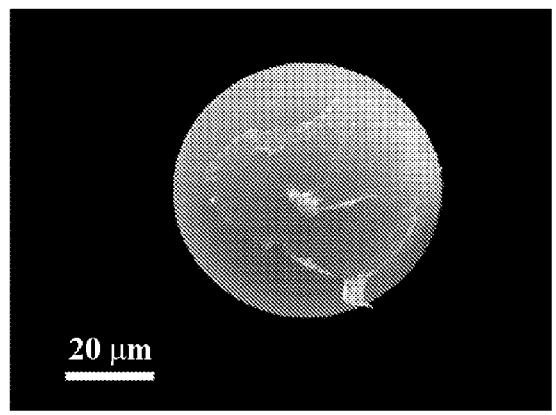
FIG. 21C
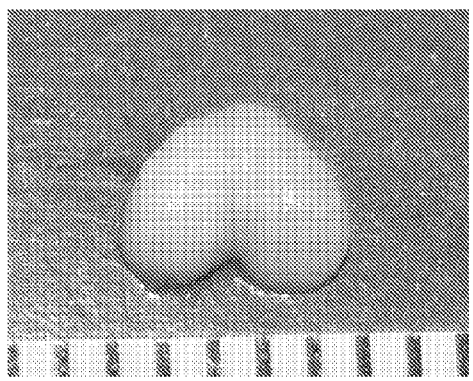
FIG. 25
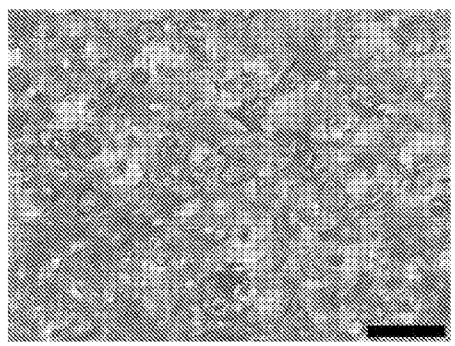 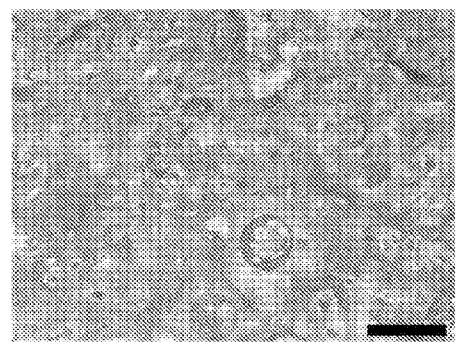
FIG. 26A          FIG. 26B

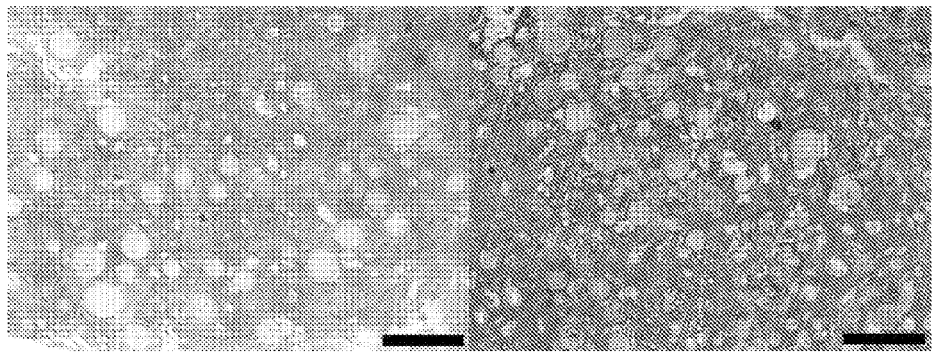
FIG. 39A  FIG. 39B
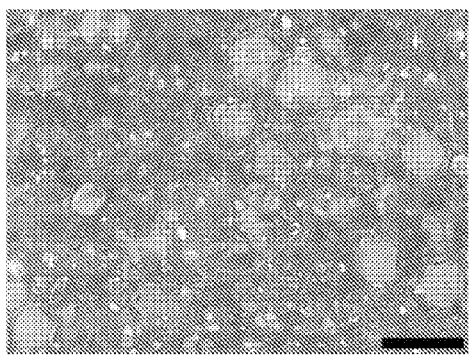 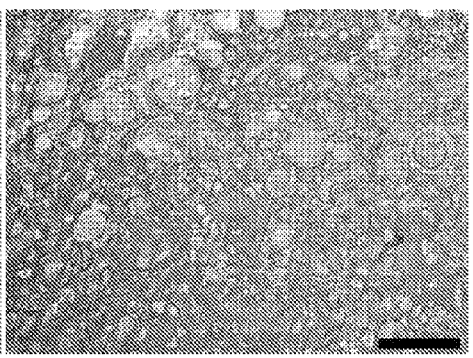
FIG. 39C  FIG. 39D
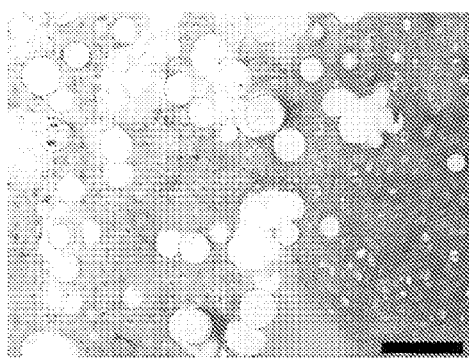 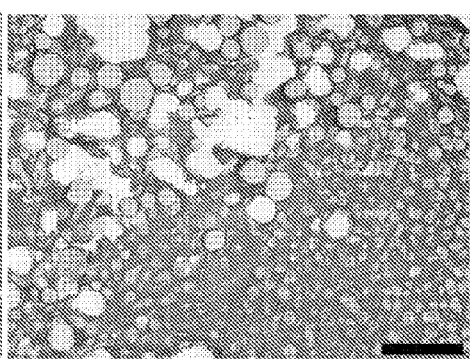
FIG. 39E  FIG. 39F

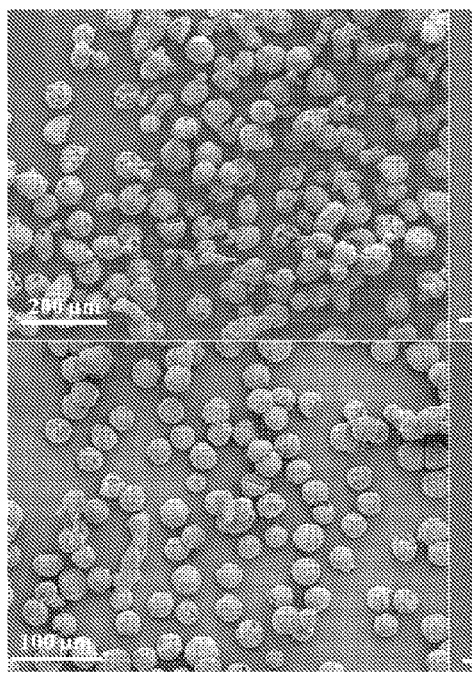
FIG. 55A  
FIG. 55C
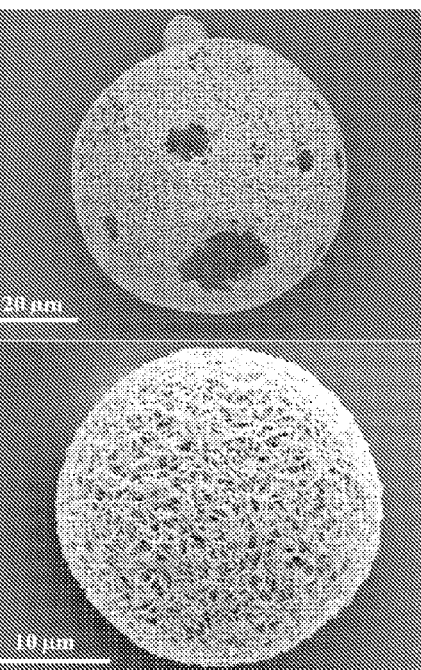
FIG. 55B  
FIG. 55D
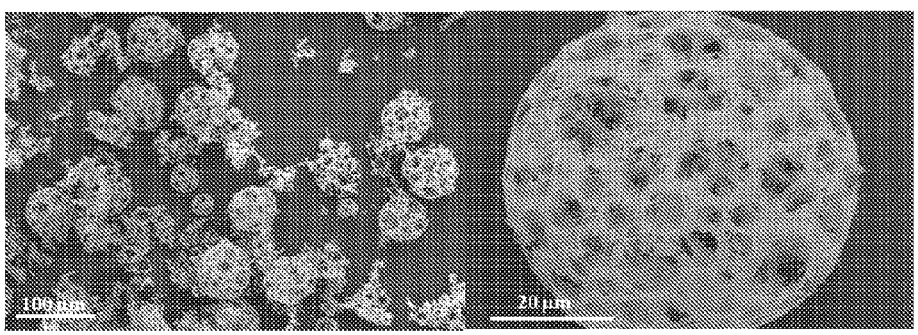
FIG. 56A  FIG. 56B

NANO-FIBROUS MICROSPHERES AND METHODS FOR MAKING THE SAME

CROSS-REFERENCE TO RELATED APPLICATIONS

This application is a 371 of PCT/US11/24196 filed on Feb. 9, 2011 which claims the benefit of U.S. Patent Provisional Application Ser. No. 61/302,689, filed Feb. 9, 2010, entitled "Nano-fibrous Microspheres and Methods for Making the Same," which application is incorporated by reference herein in its entirety.

STATEMENT REGARDING FEDERALLY SPONSORED RESEARCH OR DEVELOPMENT

This invention was made with government support under grants DE015384, DE017689 and GM075840 awarded by the National Institutes of Health. The government has certain rights in the invention.

BACKGROUND

The present disclosure relates generally to nano-fibrous microspheres.

Biomaterials have been shown to be useful for engineering tissue regeneration and repair. In many instances (e.g., fabricating an entire organ or a large piece of tissue for transplant), it is desirable or even necessary to utilize biomaterial scaffolds that are designed specifically for the patient's anatomy. Designing such scaffolds may be difficult, due to irregular shaped defects and wounds. Hydrogels or other fluid-like injectable materials are often used in such instances. While such materials may be readily manipulated and minimally invasive, they do have limitations. Some fluid-like injectable materials do not possess a desired level of biodegradability, do not include large pores (which may be ideal for cell migration and proliferation), and/or do not have suitable adhesive properties.

BRIEF DESCRIPTION OF THE DRAWINGS

Features and advantages of examples of the claimed subject matter will become apparent by reference to the following detailed description and drawings, in which like reference numerals correspond to similar, though perhaps not identical, components. For the sake of brevity, reference numerals or features having a previously described function may or may not be described in connection with other drawings in which they appear. In some of the figures, the * or ** denotes a statistically significant difference between the experimental group and the control group.

FIGS. 7A through 7E together illustrate a schematic flow diagram of an embodiment of a method for forming hollow nano-fibrous microspheres (NF-HMS);

FIGS. 10A through 10C are SEM images of hollow nano-fibrous microspheres (NF-HMS) fabricated with star-shaped PLLA (SS-PLLA, 2.0% wt/v)), wherein FIG. 10B is a representative image of one of the microspheres and FIG. 10C is a higher magnification of a portion of the sphere in FIG. 10B;

FIGS. 21A through 21C are SEM images showing the adhesion of chondrocytes on NF-HMS, NF-MS, and SI-MS;

FIG. 25 is a photograph illustrating de novo cartilage tissue formation with the anatomical shape of a rat femoral condyle, the newly harvested tissue had a white and glistening surface and the tick mark is 1 mm;

FIGS. 26A and 26B are, respectively, Safranin-O and immunohistochemical staining of new tissue from the NF-HMS/chondrocyte construct demonstrating GAG and collagen type II accumulation, where the scale bars are 100 µm;

FIG. 28A is the group of chondrocytes alone, FIG. 28B is the group of SI-MS/chondrocytes, FIG. 28C is the group of NF-MS/chondrocytes (where the arrows indicate a NF-MS), FIG. 28D is the group of NF-HMS/chondrocytes (where the arrow indicates a NF-HMS), and FIG. 28F is the control group of native rabbit knee cartilage, where the scale bars in all figures represent 100 µm, * $p<0.05$, ** $p<0.01$;

FIG. 36A is the group of chondrocytes alone, FIG. 36B is the group of SI-MS/chondrocytes, FIG. 36C is the group of NF-MS/chondrocytes, and FIG. 36D is the group of NF-HMS/chondrocytes, where the scale bars in all figures represent 50 µm, * $p<0.05$, ** $p<0.01$;

FIGS. 39A through 39F illustrate the staining of the in vitro cartilage tissue formation experiments, where FIG. 39A is Safranin-O staining of a NF-MS specimen, FIG. 39B is immunohistochemical staining of a NF-MS specimen for collagen type II, FIG. 39C is Safranin-O staining of a NF-HMS specimen, FIG. 39D is immunohistochemical staining of a NF-HMS specimen for collagen type II, FIG. 39E is Safranin-O staining of a SI-MS specimen, and FIG. 39F is immunohistochemical staining of a SI-MS specimen for collagen type II, where scale bars represent 50 µm,* $p<0.05$, ** $p<0.01$;

FIG. 48A illustrates the NF-MS after 4 days, FIG. 48B illustrates the NF-MS after 10 days, FIG. 48C illustrates the NF-MS after 20 days, FIG. 48D illustrates the NF-MS after 30 days, FIG. 48E illustrates the SI-MS after 4 days, FIG. 48F illustrates the SI-MS after 10 days, FIG. 48G illustrates the SI-MS after 20 days, and FIG. 48H illustrates the SI-MS after 30 days;

FIGS. 55A through 55D are SEM images of microspheres fabricated from 4-branch PLLA-1 (FIGS. 55A and 55B) and from 4-branch PLLA-3 (FIGS. 55C and 55D), at a concentration of 2% w/v; and FIGS. 56A and 56B are SEM images of nano-fibrous microspheres fabricated from 16-branch PLLA-1 at a concentration of 2% w/v.

DETAILED DESCRIPTION

Figure 1:
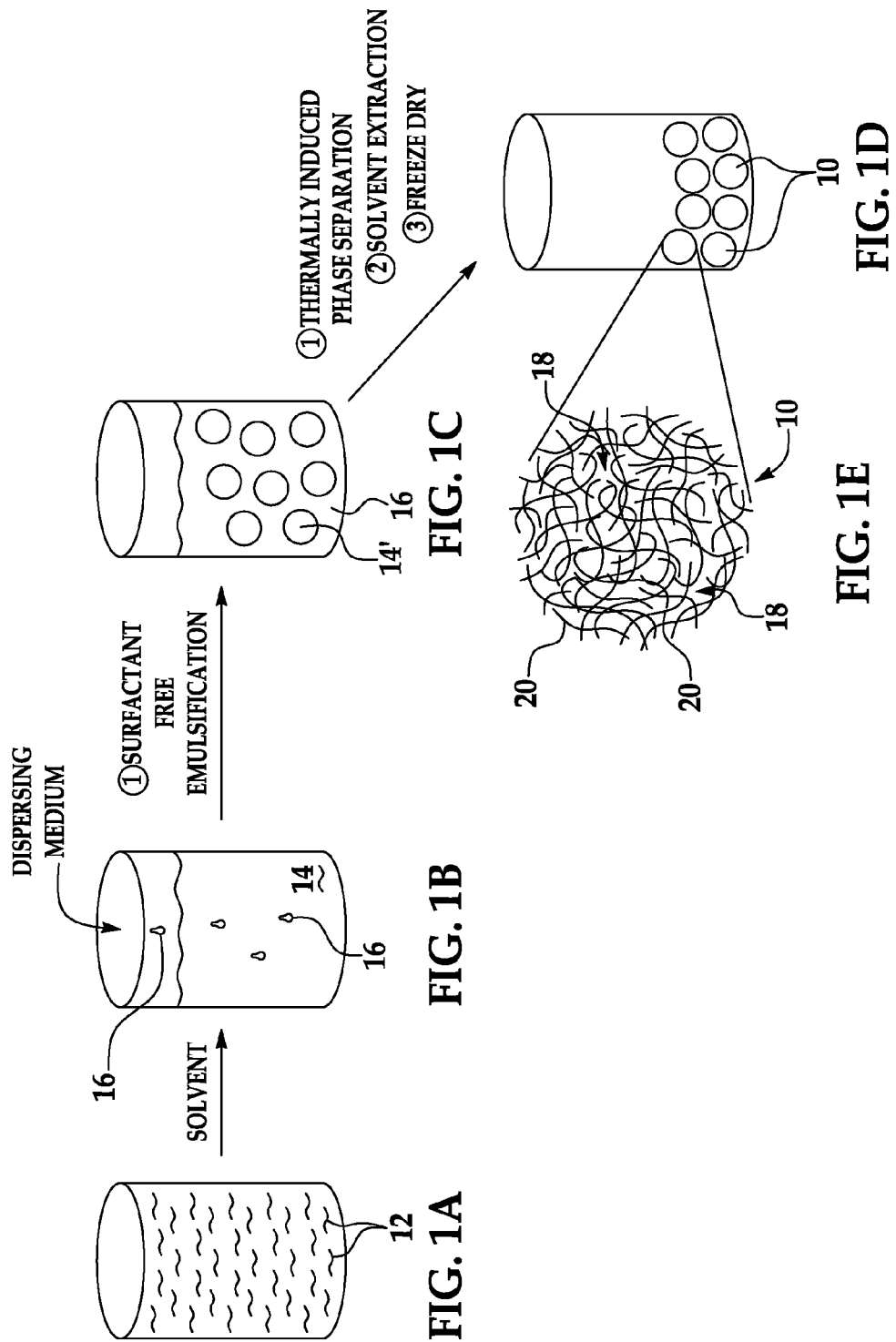
FIGS. 1A through 1E together illustrate a schematic flow diagram of an embodiment of a method for forming non-hollow nano-fibrous microspheres (NF-MS)

Embodiments of the method disclosed herein enable polymers (both linear and star-shaped polymers) to phase-separate and self-assemble to form nano-fibrous microspheres and nano-fibrous hollow microspheres. Non-hollow nano-fibrous microspheres are structures that are made up of interconnected fibers that have a diameter measured on the nano-scale (i.e., ranging in size between about $10^{-10}$ meters and about $10^{-6}$ meters). These structures have pores at their surfaces and throughout their geometry, but do not contain a hollow portion at the core of the structure. Hollow nano-fibrous microspheres are also structures that are made up of interconnected fibers that have a diameter measured on the nano-scale. However, these structures have larger open hole(s) through the shell of the hollow spheres, and also contain at least one large interior hollow portion. In one example, a single hollow portion extends from one end of the structure to another end of the structure through the core. In another example, multiple hollow portions are formed throughout the microsphere. The pores (i.e., the relatively small openings formed between nano-fibers) or holes (i.e., the larger openings in the shell of the microsphere) of the microspheres may be on the nano-scale, the micro-scale (i.e., ranging in size between about $10^{-6}$ meters and about $10^{-3}$ meters), or combinations thereof.

It is believed that the nano-fibrous microsphere architectures disclosed herein mimic the extracellular matrix (ECM) thus rendering the nano-fibrous microspheres suitable for enhancing cell-material interactions, promoting cell migration, proliferation and mass transport conditions (e.g., between spheres, within spheres, and/or between nano-fibers of the spheres), delivering (e.g., controllably releasing) biological and non-biological molecules (e.g., drugs, biomolecules, etc.), cell/microorganism loading and/or growth (e.g., to expand cells, generate biproducts, etc.), and facilitating tissue regeneration and integration within a host (e.g., the spheres may be used as injectable cell carriers for tissue engineering and repair in animals, humans, etc.). The nano-fibrous microspheres disclosed herein may also be suitable for use as porous matrices (e.g., for separation, filtration, cell culture, catalysis, supporting chemical reaction, and as chromatography column fillers), insulating materials, gas/liquid absorbents, or mechanical impact/vibration absorbing materials.

The nano-fibers of the microspheres disclosed herein may be made up of linear polymers or star-shaped polymers. As used herein, the term "linear polymer" refers to a polymer in which the molecules form long chains without branches or cross-linked structures. Also as used herein, the term "star-shaped polymer' means a polymer having at least three branches. The multiple chains or branches of the star-shaped polymer are connected to a central point. In one embodiment, the branches are formed from functional groups of a multi-functional core molecule that can initiate a chain forming reaction or can link/couple to other molecular chains (e.g., oligomers, polymers or copolymers, macromolecules, e.g., large molecules such as nucleic acids, proteins, etc.). Specific and non-limiting examples of such polymers are described further herein.

The method(s) disclosed herein enable the controlled formation of microspheres from the polymers. Controlled preparation results in microspheres having desirable characteristics, for example, for a particular end use. As one example, it has been found that the polymer concentration and process parameters (e.g., stirring speed) affect the average size of the hollow core and open holes of the hollow nano-fibrous microspheres. As another example, it has been found that the architecture and molecular weight of the polymers selected affect the self-assembling behavior of the polymer, and thus affects the final structures of the formed microspheres. In one example, when the molecular weight of either the linear polymer or the star-shaped polymer equals or exceeds 10 kDa, the resulting microsphere possesses the nano-fibrous structure. In some instances, non-hollow microspheres may be prepared when using linear polymers or star-shaped polymers having three branches of a particular molecular weight. In other instances, hollow microspheres may be prepared when using star-shaped polymers having three or more branches and having a particular molecular weight. In one example, hollow microspheres may be prepared using star-shaped polymers having more than three branches and having a molecular weight ranging from about 50 kDa to about 100 kDa. If the molecular weight is increased (e.g., beyond 100 kDa), the hollow core and/or the open holes may be deleteriously affected. Additionally, it is believed that the size of the hollow core and the open holes increases with an increasing number of branches, and the walls of the microspheres becomes thinner. While some examples and particular ranges or structures have been provided herein, it is to be understood that these examples are non-limiting, and that other conditions may be changed in order to obtain nano-fibers and non-hollow or hollow microspheres. For example, it is believed that certain process and/or material conditions may be altered in order to obtain hollow microspheres from a three branch star-shaped polymer or a polymer outside of the example molecular weight range.

Referring now to FIGS. 1A through 1E, an embodiment of a method for forming a porous and non-hollow microsphere 10 (a schematic view of which is shown in FIG. 1E) is depicted. As shown schematically in FIG. 1A, a linear polymer 12 or a star-shaped polymer having three-branches and a molecular weight of at least about 10 kDa is used to formulate this embodiment of the microsphere 10. In one example, the molecular weight of the three branch star-shaped polymer is at least about 50 kDa. Examples of suitable linear polymers 12 include poly(L-lactic acid) (PLLA), modified poly(L-lactic acid) (e.g., PLLA-based graft and block copolymers), polycaprolactone, polyamides, polyacrylonitrile, and gelatin. An example of the star-shaped polymer having three-branches and a molecular weight of about 50 kDa or lower is 3-branch PLLA.

In one example (not shown in FIGS. 1A-1E), the linear polymer 12 or the star-shaped polymer (having 3 branches) may be synthesized from a monomer and an initiator. An example of a suitable monomer and a suitable initiator for forming the linear polymer 12 include L-lactide and ethylene glycol. Other monomers include ϵ-caprolactone, acrylonitrile, amides, derivatives thereof, and mixtures thereof. Other initiators suitable for forming the linear polymer 12 include 1-propanol, 2-propanol, 1-butanol, 2-butanol, 1,4-butanediol, tert-butanol, 2,2-dimethyl-1-propanol, 1-pentanol, 1,2-pentanediol, 1,3-propanediol, 1-hexanol, 1,2-hexanediol, 1-dodecanol, 1-decanol, 1,10-decanediol, 1,2-dodecanediol, 1,2-tetradecanediol, and poly(ethylene glycol). An example of a suitable monomer and a suitable initiator for forming the 3-branch star-shaped polymer (e.g., 3-branch PLLA) include L-lactide and glycerol. Other initiators suitable for forming the 3-branch star-shaped polymer include 1,2,4-butanetriol, 1,2,6-hexanetriol, 3-methyl-1,3,5-pentanetriol, and castor oil. In any instance, the monomer and initiator are mixed together, either with or without a catalyst. The reaction mixture may be purged and placed into a bath at a suitable polymerization temperature. This temperature depends upon the monomer selected. After allowing the reaction to occur for a desirable time, the reaction mixture may be dissolved into a suitable solvent, and then precipitated into an excess of a non-solvent. Again, the solvent and non-solvent selected will depend upon the monomer selected. The reaction mixture may be filtered, and the dissolution/precipitation process may be repeated for one or more times. Once the final product is obtained, it may be dried. It is to be understood that a similar process may be used to form the star-shaped polymer used in the example of the method shown in FIGS. 7A through 7E, except that the initiator selection will vary in order to obtain a star-shaped polymer instead of a linear polymer.

As shown in FIG. 1B, the linear polymer 12 is dissolved in a suitable solvent to form a solution 14. In one non-limiting example, when PLLA is selected as the polymer 12, tetrahydrofuran (THF) may be selected as the solvent. Other suitable solvents include a combination of dioxane and methanol or a combination of THF and water.

The solution 12 may be stirred as a dispersing medium 16 is slowly added thereto. Examples of suitable dispersing media 16 include glycerol and water. Generally, the volume of the dispersing medium 16 added is greater (e.g., three times greater) than the volume of solution 14 present. As the dispersing medium 16 is added, a phase-inversion emulsion is formed in which the solution 14 becomes liquid microspheres 14' (i.e., the discontinuous phase) within the dispersing medium 16 (i.e., the continuous phase). The emulsion is shown in FIG. 1C.

The emulsion then undergoes thermally induced phase separation in order to facilitate nano-fiber generation in each of the liquid microspheres 14'. Thermally induced phase separation may be accomplished by quenching the emulsion in liquid nitrogen, dry ice, or another sufficiently cool medium (e.g., liquid or gas) for a predetermined time. A sufficiently cool medium is one that induces formation of a gel-like structure from the emulsion. After phase separation is complete, the nano-fibrous microspheres 10 are formed. The nano-fibrous microspheres 10 contain the solvent and are still present in the dispersing medium 16 (not shown), and thus solvent extraction/exchange may then be accomplished in order to remove the solvent and dispersing medium 16. Any suitable non-solvent of the polymer may be used for the exchange, and in one non-limiting example distilled water or a water-ice mixture is utilized.

Figure 2:
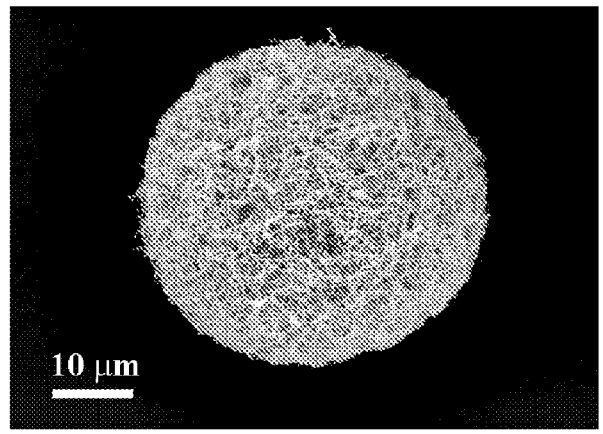
FIG. 2 is a scanning electron micrograph (SEM) image of a representative NF-MS formed with poly(L-lactic acid), showing a nano-fibrous architecture on the microsphere surface.

After solvent/dispersing medium 16 extraction, the nano-fibrous microspheres 10 may be sieved and washed to remove any solvent and/or dispersing medium 16 residue that may be present. The nano-fibrous microspheres 10 are then lyophilized (i.e., freeze-dried) for a predetermined time. The final nano-fibrous microspheres 10 are schematically shown in FIG. 1D, and an enlarged schematic view of one nano-fibrous microsphere 10 is shown in FIG. 1E. A scanning electron micrograph (SEM) of a nano-fibrous PLLA microsphere (formed via the process described in Example 1) is illustrated in FIG. 2. The SEM image represents an actual sample of the microspheres 10 formed via the process described in reference to FIGS. 1A though 1E.

Figure 3A:
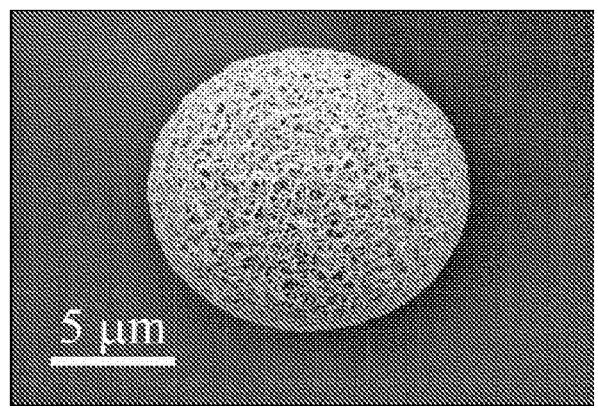
FIGS. 3A through 3D are SEM micrographs of NF-MS fabricated with 4.0% (wt/v) PLLA solution (FIGS. 3A and 3B) and with 6.0% (wt/v) PLLA solution (FIGS. 3C and 3D)
Figure 3B:
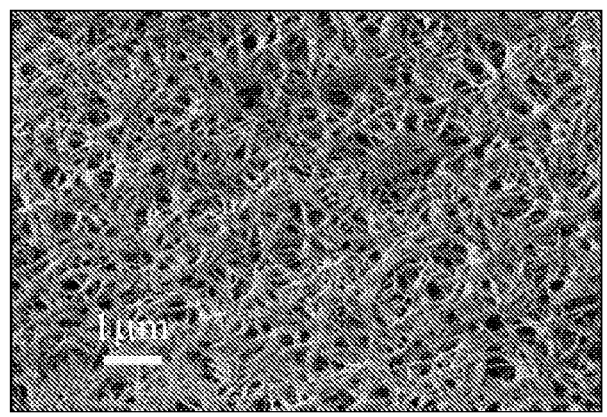
Figure 3C:
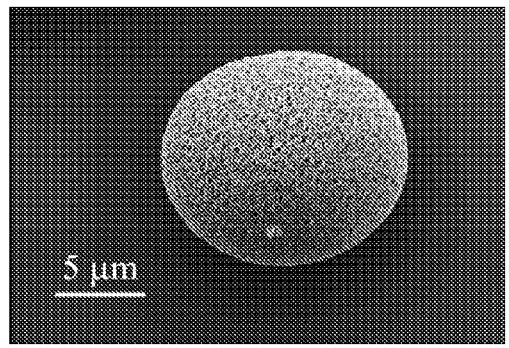
Figure 3D:
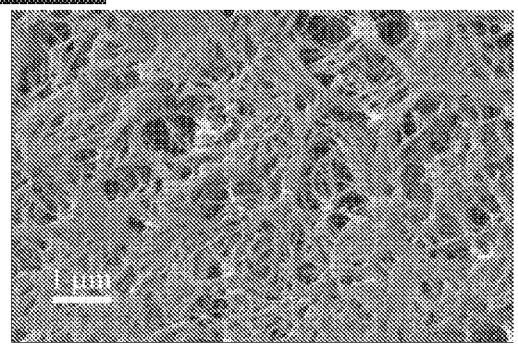

As illustrated in FIGS. 1E and 2, the nano-fibrous microspheres 10 include a number of pores 18 between the nano-fibers 20. It is to be understood that both the porosity and the length of the nano-fibers 20 may be tailored by altering the concentration of the linear polymer 12 used in the process. FIGS. 3A and 3B are SEM images of nano-fibrous microspheres 10 formed with 4.0% (wt/v) PLLA solution and FIGS. 3C and 3D are SEM images of nano-fibrous microspheres 10 formed with 6.0% (wt/v) PLLA solution. As illustrated, the porosity of the spheres 10 and the length of the nano-fibers 20 significantly decreased as the polymer 12 concentration increases. Table 1, below, sets forth the structural parameters of examples of nano-fibrous PLLA microspheres fabricated from different concentrations of the polymer 12.

TABLE 1

| Polymer Concentration (%) | Porosity* (%) | Fiber Diameter (nm) | Fiber Length (nm) |
| --- | --- | --- | --- |
| 1.0 | 96.66 ± 0.24 | 162 ± 45 | 1645 ± 420 |
| 2.0 | 96.21 ± 0.30 | 153 ± 57 | 1276 ± 385 |
| 4.0 | 92.80 ± 0.68 | 169 ± 68 | 982 ± 288 |
| 6.0 | 90.02 ± 0.60 | 167 ± 79 | 794 ± 269 |

*The porosity is calculated based on the formula: $\epsilon = (V - V_{PLLA})/V$, where V is the total volume measured, and $V_{PLLA}$ is the volume of PLLA calculated from the mass and the density of PLLA.

The porosity of the microspheres 10 and the length of the nano-fibers 20 decrease as the polymer 12 concentration increases. As such, the polymer 12 concentration used in the process shown and described in reference to FIGS. 1A through 1E may be modified in order to achieve microspheres 10 having a desirable porosity and nano-fiber 20 length.

The diameter of the fibers 20 is relatively unaffected by the polymer 12 concentration. The porous and non-hollow microspheres 10 disclosed herein have nano-fibers 20 with a diameter ranging from about 1 nm to about 1 μm, or more particularly from about 50 nm to about 500 nm (which is comparable to the size of a natural collagen matrix). In one non-limiting example, the average diameter and length (measured between two adjacent junctions or conjunctions) of the nano-fibers 20 are 156±45 nm and 1745±320 nm, respectively.

Figure 4A:
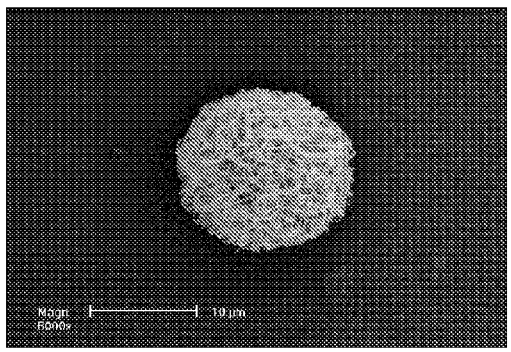
FIGS. 4A and 4B are SEM micrographs of NF-MS fabricated with 1.0% (wt/v) PLLA solution and a stirring speed of 500 rpm (FIG. 4A) and NF-MS fabricated with 6.0% (wt/v) PLLA solution and s stirring speed of 280 rpm (FIG. 4B)
Figure 4B:
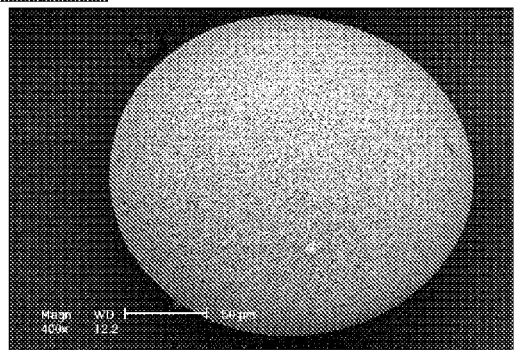

The overall size of microspheres 10 may be controlled by adjusting both the stirring speed (during emulsification) and the polymer 12 concentration. Smaller spheres 10 may be obtained when stirring speeds are higher. Larger and wider spheres 10 may be obtained by increasing the polymer 12 concentration. As such, larger spheres 10 may be obtained with a combination of slower stirring speeds and larger amounts of the polymer 12. As non-limiting examples, a stirring speed of 400 rpm and a PLLA concentration of 2.0% (wt/v) results in microspheres 10 having a size ranging from 10 μm to 180 μm (with the maximum yield at around 60 μm); a stirring speed of 500 rpm and a PLLA concentration of 1.0% (wt/v) results in microspheres 10 having a size ranging from about 15 μm to about 25 μm (see, e.g., FIG. 4A); and a stirring speed of 280 rpm and a PLLA concentration of 6.0% (wt/v) results in microspheres 10 having a size ranging from 200 μm to 300 μm (see, e.g., FIG. 4B). Generally, the microspheres 10 range from about 10 nm to about 10 mm in dimension (e.g., diameter). In one non-limiting example, the microspheres 10 have a diameter ranging from about 100 nm to about 1 mm.

The microspheres 10 also have a desirably high surface area, which is believed to be independent of the diameter of the microsphere 10. Generally, the surface area ranges from about 50 m²/g to about 300 m²/g. In one embodiment, the surface area ranges from about 75 m²/g to about 150 m²/g. In still another embodiment, the surface area ranges from about 117 m²/g to about 122 m²/g. As other examples, the surface area of nano-fibrous microspheres 10 fabricated with 6.0% (wt/v) PLLA solution and having an average diameter of 50 μm have a specific surface area of 119.7±2.3 m²/g and the surface area of nano-fibrous microspheres 10 fabricated with 6.0% (wt/v) PLLA solution and having an average diameter of 250 μm is 120.1±0.9 m²/g. In sharp contrast, solid PLLA microspheres (shown and discussed herein as the Comparative Example), which are prepared in an O/W ($CH_2Cl_2$/$H_2O$) process with 6.0% (wt/v) PLLA solution have an average diameter of 50 μm and a specific surface area of about 0.1 m²/g.

Figure 5A:
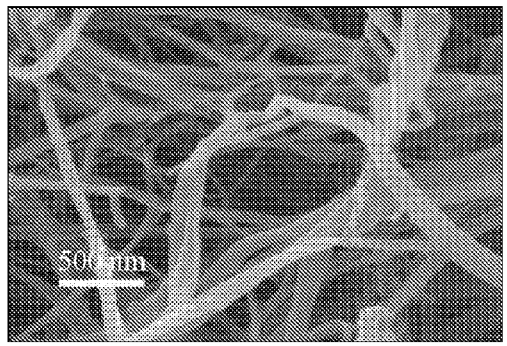
FIGS. 5A through 5D are SEM micrographs of PLLA NF-MS fabricated under different gelation temperatures.
Figure 5B:
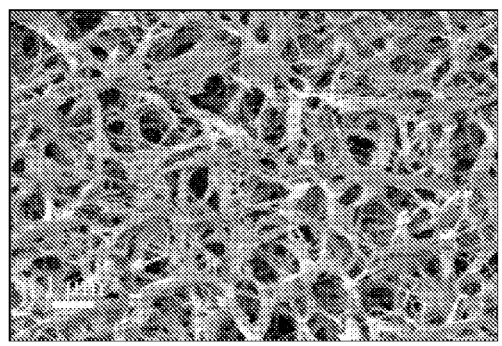
Figure 5C:
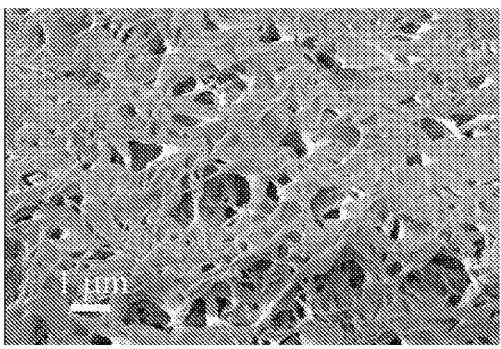
Figure 5D:
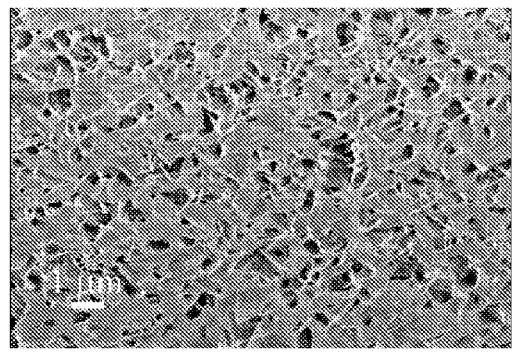

The temperature at which gelation of the liquid microspheres 14' occurs may also affect the structure of the nano-fibers 20 formed therefrom. A nano-fibrous structure is obtained when gelation temperatures below −20° C. are used. In one example, the low gelation temperatures may be achieved when the liquid microspheres 14' are exposed to liquid nitrogen or dry ice to thermally induce phase separation. Examples of such fibrous structures are shown in FIGS. 5A (PLLA microspheres formed using liquid nitrogen) and 5B (PLLA microspheres formed using dry ice). When the gelation temperature is higher than −20° C., the nano-fibers 20 are more bonded together. Examples of such fibrous structures are shown in FIGS. 5C (PLLA microspheres formed with a gelation temperature of −10° C.) and 5D (PLLA microspheres formed with a gelation temperature of 0° C.). As illustrated in FIGS. 5C and 5D, the nano-fibers 20 have a plate-like structure as opposed to the stringy (less bonded) fibers of FIGS. 5A and 5B.

Figure 6A:
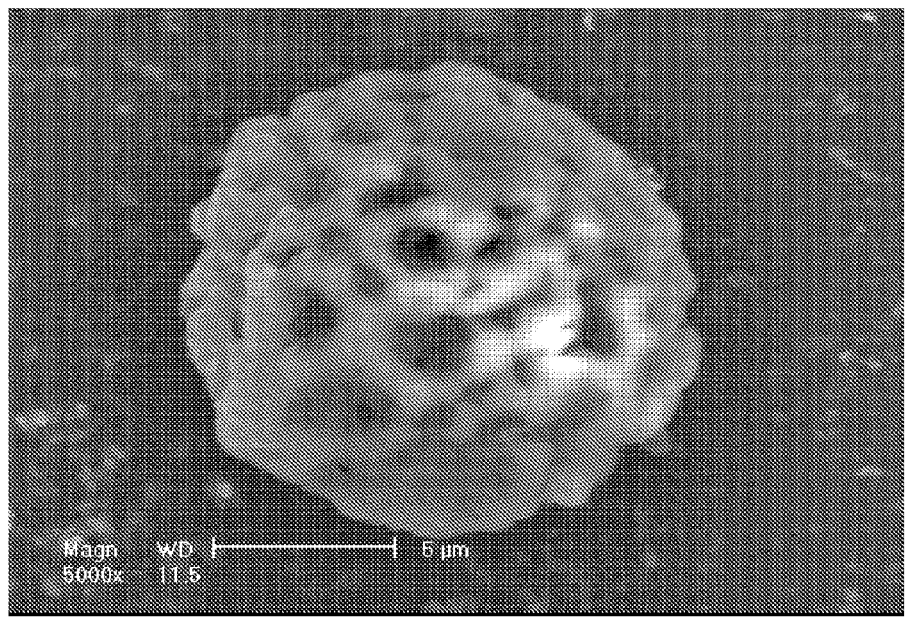
FIGS. 6A and 6B are SEM micrographs of PLLA NF-MS using water as a dispersing medium.
Figure 6B:
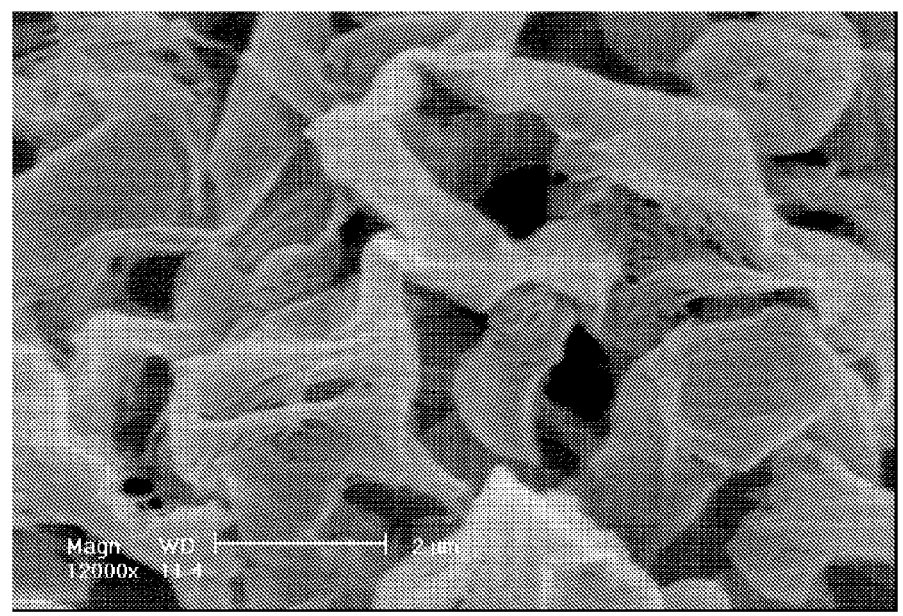

The dispersing medium 16 utilized in the method of FIGS. 1A through 1E may also affect the morphology of the formed nano-fibers 20. When glycerol is used, the nano-fibers are wire-like or stringy (see, e.g., FIGS. 2A and 2B). In contrast, when water is used, the nano-fibers are ribbon-like (see, e.g., FIGS. 6A and 6B).

In light of the above description, it is to be understood that the microspheres 10 formed via the method described in reference to FIGS. 1A through 1E may be formed having a desirable size, porosity, nano-fibrous structure, and/or nano-fibrous morphology, which may depend upon the desired end use.

Referring now to FIGS. 7A through 7E, a method for forming another embodiment of the microspheres 10' (shown schematically in FIG. 7E) is depicted. This embodiment of the microsphere 10' is porous and has a hollow core 22.

Figure 8A:
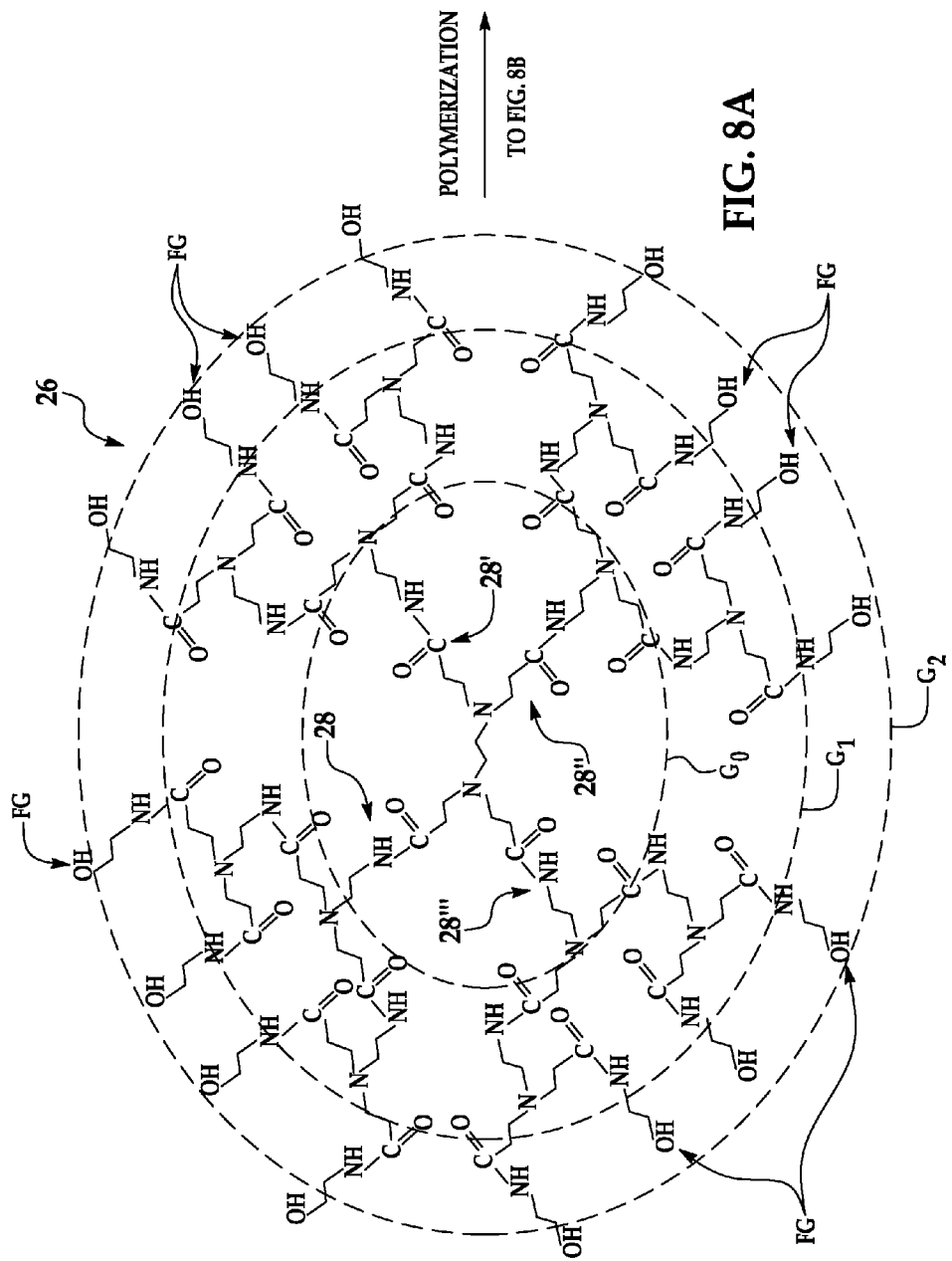
FIGS. 8A and 8B illustrate the formation of a star-shaped polymer.
Figure 8B:
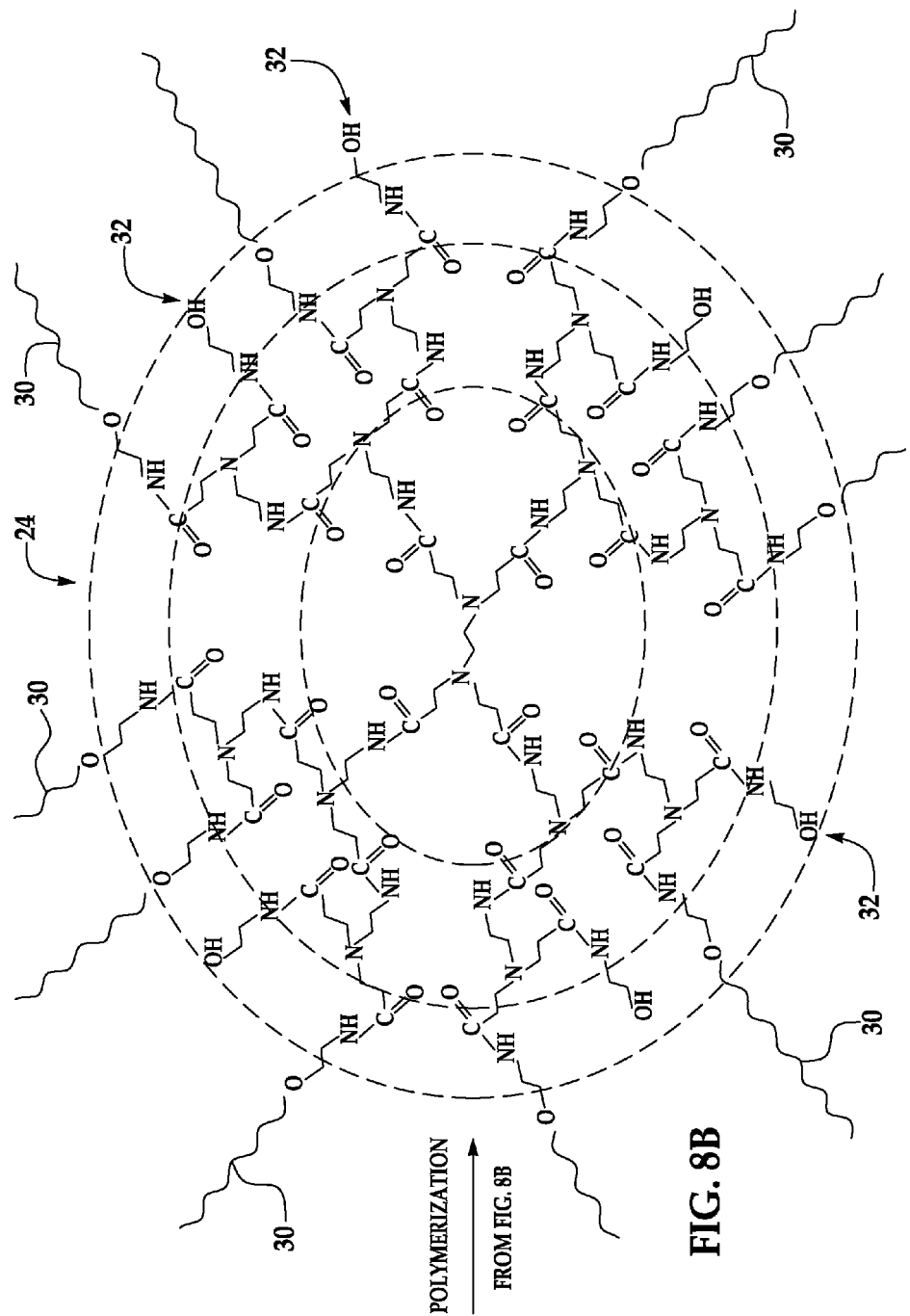

This embodiment of the method utilizes a star-shaped polymer 24, shown in FIG. 7A and FIG. 8B. As previously mentioned, the star-shaped polymer 24 can include a multi-functional core molecule 26 having at least three branches 28, 28', 28'', 28''' (see FIG. 8A) with functional groups FG that can initiate a chain forming reaction or can link/couple to other molecules chains 30 (e.g., oligomers, polymers or copolymers, and/or macromolecules). Examples of the multi-functional core molecule 26 include poly(amidoamine) (PAMAM) dendrimers having OH functional groups. A dendrimer is an artificially manufactured or synthesized polymer molecule built up from branched monomer units. The dendrimer is defined by highly branched monomers, which through stepwise reactions, build up a tree-like or generational structure. Each additional monomer layer is referred to as a generation. The center molecule is generation 0, and each successive repeat unit along the original branches 28, 28', 28'', 28''' forms the next generation. The multi-functional core molecule 26 shown in FIG. 8A is a generation 2 (G2) dendrimer, where generation 0 is labeled G0, generation 1 is labeled G1, and generation 2 is labeled G2. Lower generation (G≤5) PAMAM dendrimers may be desirable because they are non-immunogenic and not toxic at low concentrations. However, while various generations of poly(amidoamine) dendrimers are described herein, it is to be understood that any other multi-functional core molecule 26 may be utilized to form the star-shaped polymer 24. Examples of other multi-functional core molecules 26 that may be used include pentaerythritol or N,N,N',N'-tetra(2,3-dihydroxpropyl)ethane-1, 2-diamine. These multi-functional core molecules 26 include, respectively, 4 and 8 hydroxyl functional groups.

The initiator/multi-functional core molecule 26 may be purchased commercially or may be synthesized. For example, N,N,N',N'-tetra(2,3-dihydroxypropyl)ethane-1,2-diamine may be synthesized via an addition reaction between glycidol and ethylenediamine.

In one example, the star-shaped polymer 24 is formed via ring open polymerization conducted under anhydrous conditions. FIGS. 8A and 8B will be referenced now to describe the synthesis of one example of the star-shaped polymer 24. The selected multi-functional core molecule 26 is exposed to evaporation to remove any solvent that may be present. Polymerization may be carried out after monomers, and in some instances a catalyst, are added to the dried multi-functional core molecule 26. The multi-functional core molecule 26 may function as an initiator for the polymerization. Generally, polymerization takes place at a predetermined temperature and for a predetermined time, which depend upon the materials used. In one non-limiting example, the polymerization is carried out at a temperature ranging from about 100° C. to about 180° C. for anywhere from 12 hours to 36 hours. It is to be understood that depending upon the materials used, the polymerization temperature may range anywhere from 20° C. to about 250° C. The crude star-shaped polymer 24 may be purified by repeated precipitations from a solvent into a non-solvent.

Figure 9:
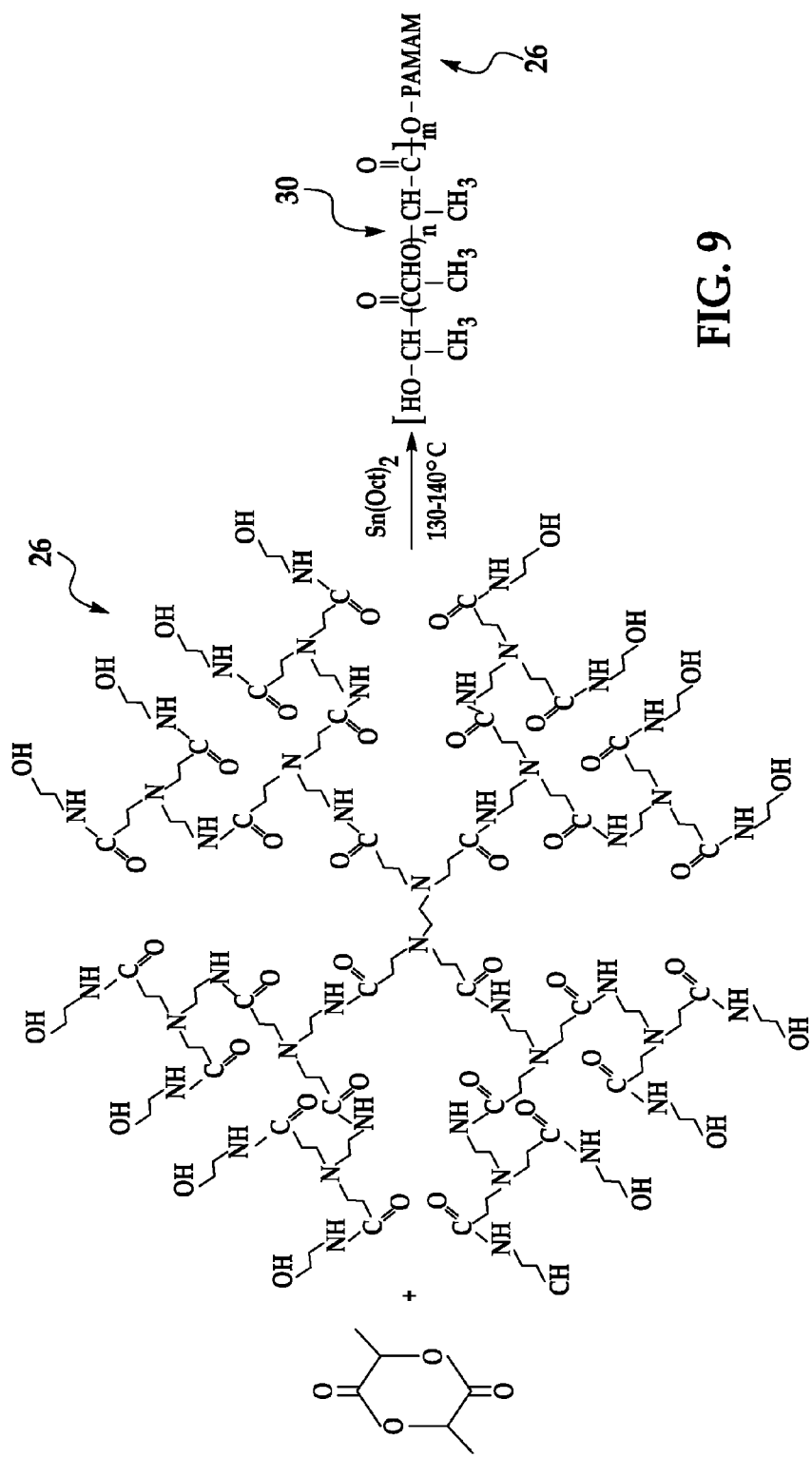
FIG. 9 illustrates the synthesis of generation 2 PAMAM with L-lactide.

FIG. 9 illustrates the synthesis of a star-shaped polymer 24 using generation 2 PAMAM (i.e., the initiator) with L-lactide (i.e., the monomers) and $Sn(Oct)_2$ (i.e., the catalyst) to form the star-shaped molecule 24 having PLLA chains 30 linked to a plurality of the functional groups of the generation 2 PAMAM core 26.

As shown in both FIGS. 8B and 9, at least some of the functional groups FG on the surface of the multi-functional core molecule 26 do not react to form polymer chains 30. It is believed that this is due, at least in part, to steric hindrance. The un-reacted functional groups 32 will be discussed further herein in reference to FIGS. 7A through 7E.

Generally, the average molecular weight of each polymer/oligomer/macromolecule branch 30 and of the star-shaped molecule 24 itself may be tailored by modulating the multi-functional core molecule 26 (i.e., initiator)/monomer ratio and the number of generations of the multi-functional core molecule 26. For the synthesis shown in FIG. 9, each PLLA branch ($M_{n(branch)}$) and the SS-PLLA ($M_{n(SS-PLLA)}$) may be tailored by modulating the PAMAM/L-lactide ratio and the number of generations of PAMAM (see Table 2).

TABLE 2

| Initiator[a] | Functional groups | [M]/[I][b] | [M]/[OH] | Molecular weight | | | Polydispersity[f] |
| --- | --- | --- | --- | --- | --- | --- | --- |
| | | | | Mn (NMR)[c] | Mn (NMR)[d] | Mn (GPC)[e] | |
| G2 | 16 | 6400 | 400 | 7100 | 74300 | 67500 | 1.5 |
| G2 | 16 | 3200 | 200 | 6600 | 69300 | 55400 | 1.6 |
| G2 | 16 | 1600 | 100 | 4500 | 48300 | 42100 | 1.7 |
| G2 | 16 | 800 | 50 | 3200 | 35300 | 26400 | 1.9 |
| G3 | 32 | 3200 | 100 | 4100 | 84800 | 44300 | 1.7 |
| G4 | 64 | 6400 | 100 | 3400 | 119700 | 48900 | 1.8 |
| G5 | 128 | 12800 | 100 | 3100 | 168600 | 56300 | 2.1 |

[a]Polymerization conditions: [Sn(Oct)$_2$]/[LLA] = 2/1000, at 130-140° C. for 24 hours.
[b][M]/[I] refers to the molar ratio of monomer to initiator.
[c]Average molecular weight of a PLLA branch, calculated from $^1$H NMR analysis by the comparison of the average signal intensity ratio of methine protons of PLLA to the terminal methine protons.
[d]Average molecular weight of SS-PLLA, calculated from $^1$H NMR analysis. The average molecular weight of SS-PLLA is calculated as: $M_n$(NMR) = $M_n$ (one PLLA branch) × N + MW(PAMAM), where N is the average number of PLLA branches on SS-PLLA, calculated from the average signal intensity ratios of reacted methylene protons of PAMAM to the unreacted methylene protons of PAMAM together with the total number of hydroxyl groups on the PAMAM. MW(PAMAM) is the molecular weight of PAMAM.
[e]Measured by GPC and calculated using polystyrene as standards and THF as eluent. The data refers to the average molecular weight of SS-PLLA.
[f]Determined by GPC ($M_w/M_n$)

Referring back to FIGS. 7A through 7E, the star-shaped polymers 24 may be used as building blocks to assemble microspheres 10', as well as to tune the degradation rate and potentially surface functionalities of the microspheres 10'. As shown in FIGS. 7A and 7B, the star-shaped polymers 24 are dissolved in a suitable solvent to form a solution 34. In one non-limiting example, when star-shaped PLLA is selected as the polymer 24, tetrahydrofuran (THF) may be selected as the solvent. Other suitable solvents include mixtures of dioxane and methanol or THF and water.

The solution 34 may be stirred as a dispersing medium 16 is slowly added thereto. Non-limiting examples of suitable dispersing media 16 include glycerol and water. Generally, the volume of the dispersing medium 16 added is greater (e.g., three times greater) than the volume of solution 34 present. As the dispersing medium 16 is added, a phase inversed emulsion is formed in which the solution 34 becomes liquid microspheres (i.e., the discontinuous phase, not shown) within the dispersing medium 16 (i.e., the continuous phase). In one example, no surfactant is utilized in the emulsification. It is believed that the lack of surfactant advantageously avoids potential complications associated with surfactant removal.

The emulsion then undergoes thermally induced phase separation in order to facilitate nano-fiber generation in each of the liquid microspheres. Induced nano-fiber formation is shown in the microspheres 34' of FIG. 7C. Thermally induced phase separation may be accomplished by quenching the emulsion in liquid nitrogen, dry ice, or another sufficiently cool medium for a predetermined time.

In this embodiment of the method and as shown in FIG. 7E, the resulting microsphere 10' has a hollow core 22 formed therein and holes formed at the surface thereof which lead to the hollow core 22. Without being bound to any theory (as shown in FIG. 7D), the initially formed microspheres 34' may have small and viscous dispersing medium 16 drops encapsulated therein (shown as dispersing medium core 16'). The previously mentioned un-reacted functional groups 32 of the star-shaped polymers 24 (e.g., hydroxyl groups on star-shaped PLLA) may each serve as a dispersing medium-philic moiety to surround and stabilize the dispersing medium cores 16'. Similarly, the un-reacted functional groups 32 may concentrate more around dispersing medium 16 domains that bridge the outer continuous dispersing medium 16 and the inner dispersing medium core 16' of the microspheres 34' (i.e., thereby forming the holes on the shell of the hollow microspheres). Alternatively, and again without being bound to any theory, the un-reacted functional groups 32 may lead to a shortage of polymer chains 30 to form the continuous nano-fibrous shell of the resulting microspheres 34' (i.e., 10' after solvent extraction and freeze-drying). During the phase separation, these local defects (i.e., the shortage of polymer chains 30) become the holes on the shells of the hollow microspheres, while the star-shaped polymer solution 34 phase-separated/self-assembled into the nano-fibers 20'. In still another alternate embodiment, both of the previously described mechanisms may be involved in the formation of the holes on the shells.

After phase separation is complete, the nano-fibrous microspheres 34' contain the solvent and are still present in the dispersing medium 16 (see, e.g., FIG. 7C), and thus solvent extraction/exchange may then be accomplished in order to remove the dispersing medium 16. Any suitable non-solvent of the polymer may be used for the exchange, and in one non-limiting example distilled water or a water-ice mixture is utilized.

Figure 10A:
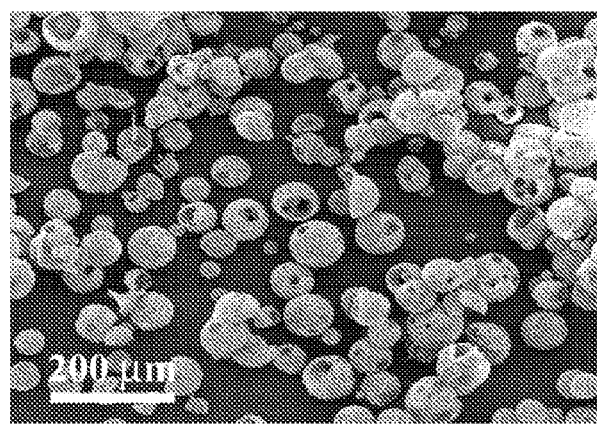
Figure 10B:
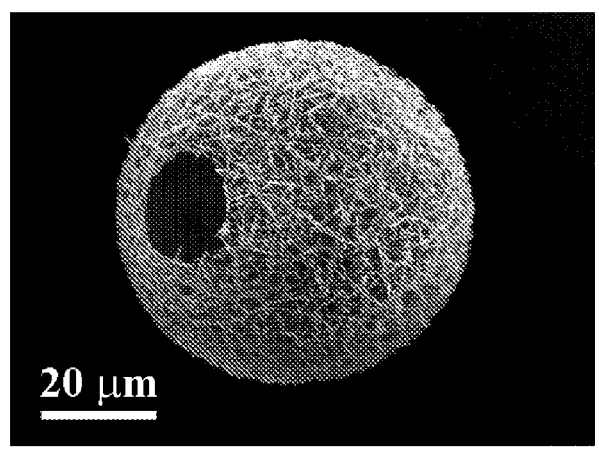
Figure 10C:
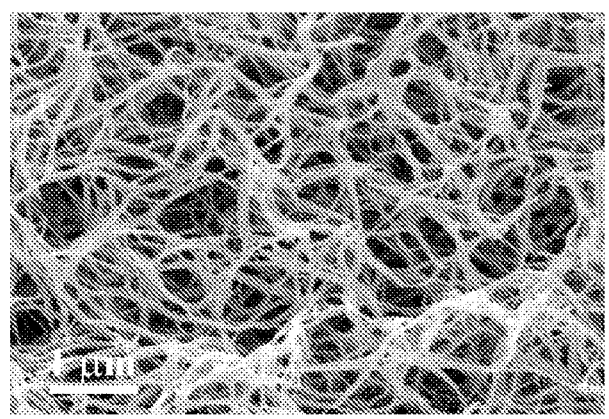

After solvent extraction, the nano-fibrous hollow microspheres 10' are formed and may be sieved and washed to remove any dispersing medium 16 residue that may be present. The nano-fibrous hollow microspheres 10' are then lyophilized (i.e., freeze-dried) for a predetermined time. The final nano-fibrous microspheres 10' are schematically shown in FIG. 7E. As depicted, the nano-fibrous hollow microspheres 10' include nano-fibers 20', pores 18 therebetween, the hollow inner core 22, and holes on the shell. The holes on the shell are generally larger than the pores 18 between the nano-fibers 20' and lead to one or more inner cores 22. Scanning electron micrographs (SEM) of a nano-fibrous PLLA microsphere (formed via the process described in Example 3) are illustrated in FIGS. 10A through 10C. These SEM images represent an actual sample of the hollow microspheres 10' formed via the process described in reference to FIGS. 7A though 7E.

Depending upon the materials and processing conditions used, the dimensions of the microspheres 10' and the nano-fibers 20' making up the microspheres 10' may vary. Generally, the microspheres 10' range from about 10 nm to about 10 mm in dimension (e.g., diameter). In one non-limiting example, the microspheres 10' have a diameter ranging from about 100 nm to about 1 mm. The average size of the formed microspheres 10' may be controlled by varying the stirring speed (during formation of the emulsion) and/or the concentration of the star-shaped polymer 24. Generally, a higher stirring speed and/or a lower polymer 24 concentration decrease(s) the average size of the microspheres 10'.

The porous and hollow microsphere 10' may have nano-fibers 20' with a diameter ranging from about 1 nm to about 1 μm, or more particularly from about 50 nm to about 500 nm (which is comparable to the size of a natural collagen matrix). In one non-limiting example, the average diameter of the nano-fibers 20' in the porous and hollow microsphere 10 is 160±67.

Furthermore, a high porosity (e.g., greater then 90%) is desirable for microspheres 10' to provide sufficient space, for example, for cell growth and extracellular matrix deposition. In the embodiments disclosed herein, the porosity of the microspheres 10' ranges from about 90% to about 98%. The porosity may be further increased by decreasing the star-shaped polymer 24 concentration.

Figure 11A:
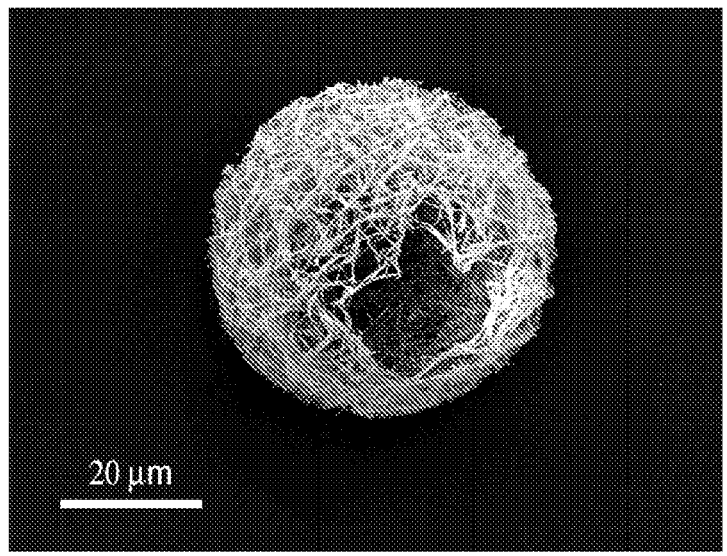
FIGS. 11A and 11B are SEM images of NF-HMS prepared with varying concentrations of SS-PLLA, namely 1.0% (wt/v) (FIG. 11A) and 6.0% (wt/v) (FIG. 11B)
Figure 11B:
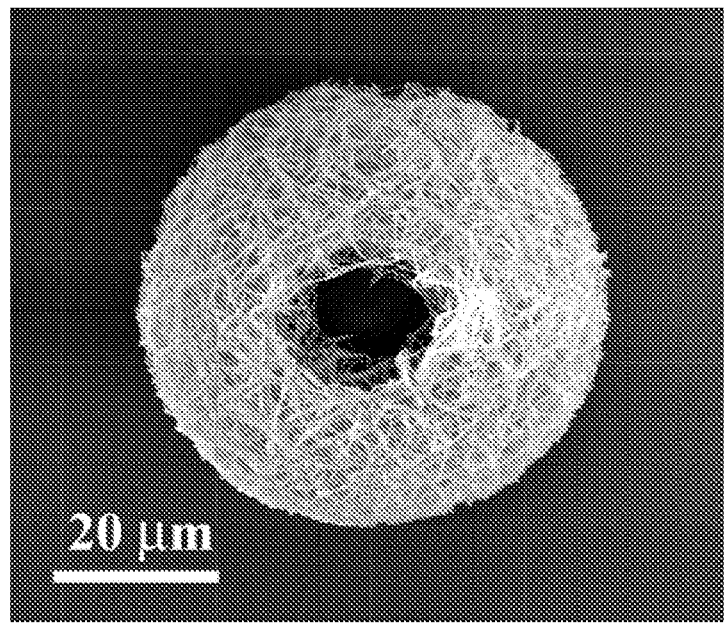
Figure 12A:
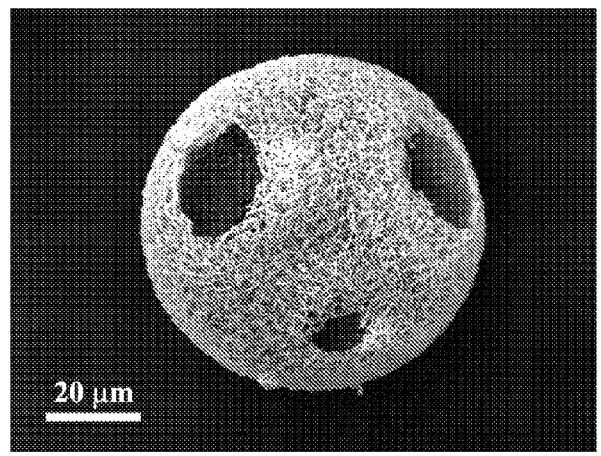
FIGS. 12A and 12B are SEM images of NF-HMS having a diameter ranging from 60-100 μm with three holes (approximately 20 μm in diameter) on the front side of the microsphere shell (FIG. 12A), and having a diameter ranging from 100-180 μm with multiple holes (approximately 20 μm in diameter) on the microsphere shell.
Figure 12B:
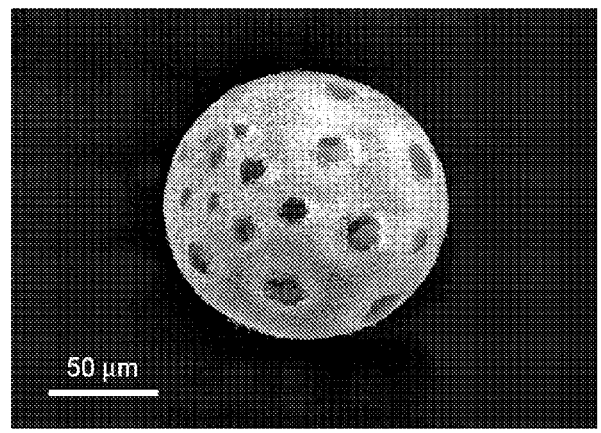

In the embodiment of the method shown in FIGS. 7A through 7E, a template is not utilized to generate the hollow core 22 containing microspheres 10'. This is due, at least in part, to the fact that the star-shaped polymer 24 is used. The diameter of the holes on the shell leading to the inner core 22 ranges from about 10 μm to 50 μm. This diameter may be controlled by the star-shaped polymer 24 concentration (see, e.g., FIGS. 11A and 11B). Generally, lower polymer 24 concentration leads to larger open holes. However, it is to be understood that microspheres 10' with less regular holes (i.e., deviating away from a circular shape) may appear when the polymer 24 concentration is decreased below 1.0% (wt/v). Examples of multiple holes observed on a microsphere 10' having a total diameter greater than 60 μm are shown in FIGS. 12A and 12B.

While the example shown in FIGS. 7A through 7E does not utilize a template, it is to be understood that hollow nano-fibrous microspheres 10' may also be formed using a template. In this embodiment, emulsification (with or without a surfactant) and thermally induced phase separation are combined with template leaching to form the hollow microspheres 10'. Particles having an average size of ranging from about 1 μm to about 1000 μm may be used as the template. Suitable template materials include sugars, salts, waxes, or any other material that can be removed via a suitable technique (e.g., dissolution, melting, evaporation, sublimation without deleteriously affecting the nano-fibers 20, 20'. In an example, the average size of the particles in the template ranges from about 2 μm to about 200 μm. In an example utilizing the template, the method described in FIGS. 1A through 1E may also be used, with the addition of the template added in the solution 14. The nano-fibers 20, 20' form around the template, which is later removed to form the inner hollow core 22. The template is removed via a medium that is both a solvent of the template and a non-solvent of the nano-fibers 20, 20'.

In still another example, mixtures of linear polymers 12 and star-shaped polymers 24 may be used to form microspheres 10 or 10'. The ratio of linear polymer 12 to star-shaped polymer 24 significantly affects the resulting microsphere structure. At low linear polymer 12 to star-shaped polymer 24 ratios, hollow microspheres 10' may be formed; and at high linear polymer 12 to star-shaped polymer 24 ratios (e.g., 6:4), non-hollow nano-fibrous structures 10 may be formed.

It is to be understood that the ranges provided herein include the stated range and any value or sub-range within the stated range. For example, a diameter range of approximately 1 nm to about 20 nm should be interpreted to include not only the explicitly recited diameter limits of 1 nm to about 20 nm, but also to include individual diameters, such as 2 nm, 3 nm, 4 nm, etc., and sub-ranges, such as 5 nm to 15 nm, 10 nm to 20 nm, etc.

To further illustrate embodiment(s) of the present disclosure, various examples are given herein. It is to be understood that these examples are provided for illustrative purposes and are not to be construed as limiting the scope of the disclosed embodiment(s).

Example 1

Non-Hollow Nano-Fibrous PLLA Microspheres

PLLA (linear PLLA with an inherent viscosity of about 1.6 dl/g) was dissolved in THF at 50° C. with a concentration of 2.0% (wt/v). Under rigorous mechanical stirring (speed 7, MAXMA™, Fisher Scientific Inc.), glycerol (50° C.) with three times the volume of the PLLA solution was gradually added into the PLLA solution, and the stirring continued for 5 minutes afterwards. The mixture was then quickly poured into liquid nitrogen. After 10 minutes, a water-ice mixture (1000 mL) was added for solvent exchange for 24 hours. The spheres were sieved and washed with excessive distilled water for 6 times to remove glycerol residue on the sphere surfaces. The spheres were then lyophilized for 3 days. The SEM image of one of these microspheres is shown in FIG. 2.

A sample of non-hollow nano-fibrous PPLA microspheres was also prepared with 1.0% (wt/v) of PLLA in THF. When discussed herein, this particular sample is referred to as "Example 1A". Otherwise, when "Example 1" is discussed, the sample formulated with 2.0% of PLLA in THF is the sample being discussed.

Example 2

Hollow Nano-Fibrous PLLA Microspheres (with Template)

Figure 13:
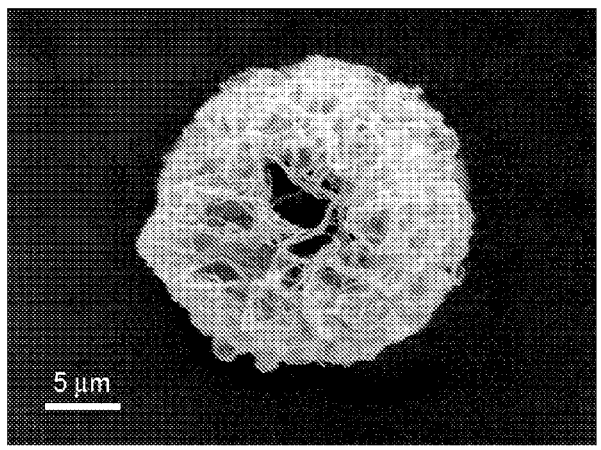
FIG. 13 is a SEM image of a nano-fibrous hollow PLLA microsphere fabricated using $Na_2CO_3$ as a template.

Nanofibrous PLLA microspheres with hollow structure were formed by combining thermally induced phase separation, surfactant-free emulsification, and template leaching processes. Linear PLLA was used as the polymer and $Na_2CO_3$ micro-particles with an average size of about 10 μm were utilized as the template to form the hollow structure. A typical nanofibrous PLLA microsphere with hollow structure is shown in FIG. 13. The size of the core and the holes on the surface of the microspheres were controlled by the size of $Na_2CO_3$ micro-particles and the ratio of $Na_2CO_3$/PLLA. Large $Na_2CO_3$ micro-particles and high $Na_2CO_3$/PLLA ratio created a hollow structure with a larger core and more open holes. However, it is to be understood that very high ratios of $Na_2CO_3$/PLLA (e.g., >5/1) could lead to PLLA precipitation.

Example 3

Hollow Nano-Fibrous PLLA Microspheres (No Template)

Synthesis of Star-Shaped PLLA

PAMAM-OH dendrimers (G2, G4, and G5) were injected into a dried glass ampule and evaporated under vacuum at 45° C. for 48 hours to remove any solvent. L-lactide and stannous 2-ethylhexanoate ($Sn(Oct)_2$) were added, and the ampule was purged six times with dry nitrogen and sealed under vacuum. Under rigorous magnetic stirring, the polymerization was carried out at 130° C. to 140° C. for 24 hours. After polymerization, the crude product was dissolved in chloroform. The polymer was purified by repeated precipitations from chloroform into methanol.

Figure 14:
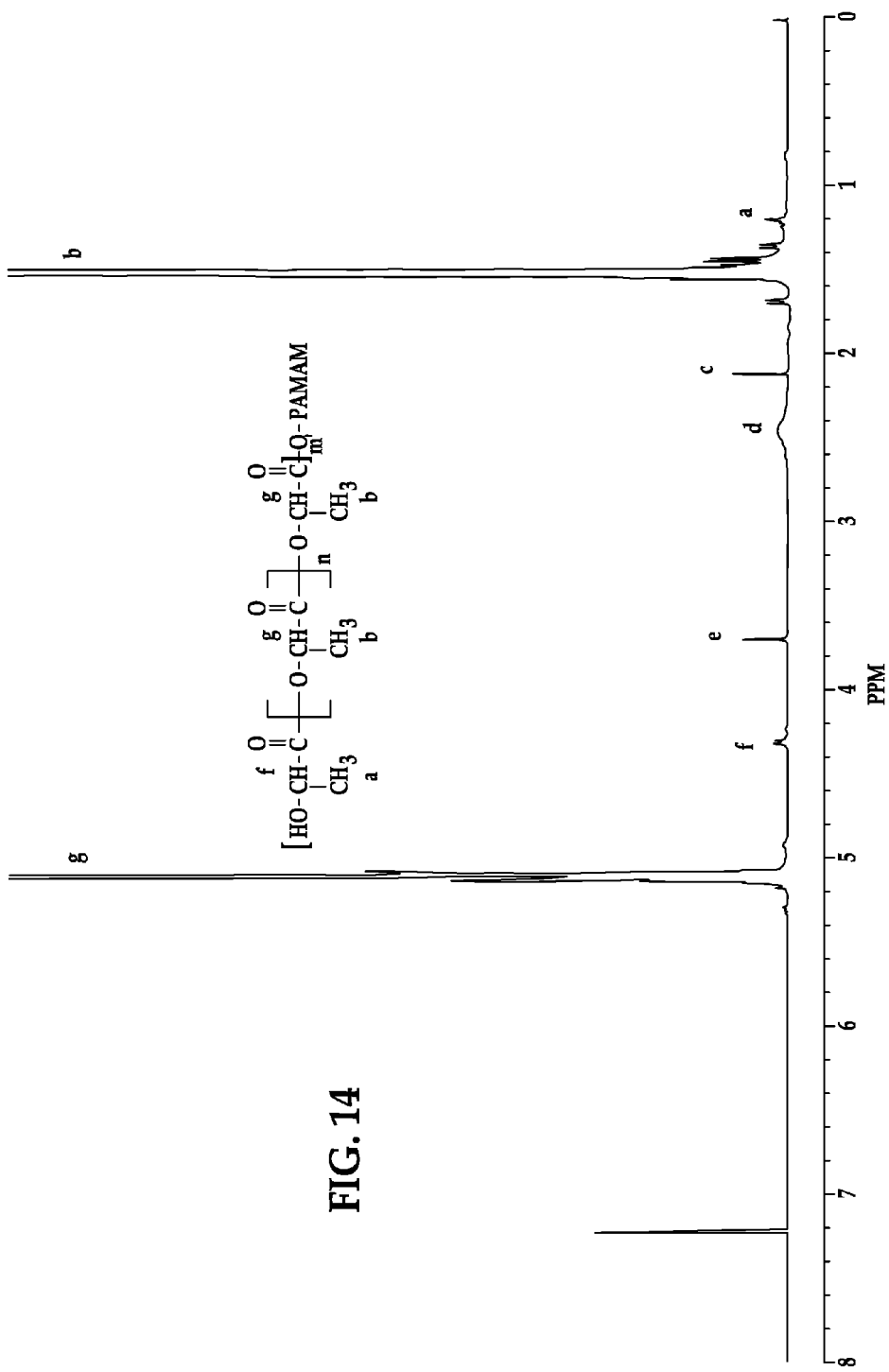
FIG. 14 is an $^1H$ NMR spectrum of the star-shaped PLLA polymerized using a generation 2 dendrimer and lactide.

A typical $^1$H NMR spectrum of the star-shaped PLLA (including peak assignments) is shown in FIG. 14. In addition to the peaks attributed to PLLA (labeled a, b, g, f), several new peaks (labeled c, d, e) appeared. These peaks were assigned to PAMAM. The average molecular weight of each PLLA branch was calculated by the peak integration ratio of peak g to peak f. As each initiator has multiple functional groups (OH) to initiate the polymerization, the synthesized polymers are star-shaped.

In this example, the $M_{n(branch)}$ of the star-shaped PLLA is controlled to be a few thousand so that the degradation time of each PLLA branch was in the range from several weeks to a few months. A representative SS-PLLA using PAMAM (G2) as an initiator was characterized as following: $M_{n(branch)}$=6600 (by $^1$H NMR), $M_{n(SS-PLLA)}$=69300 (by $^1$H NMR).

Fabrication of Microspheres

Figure 15A:
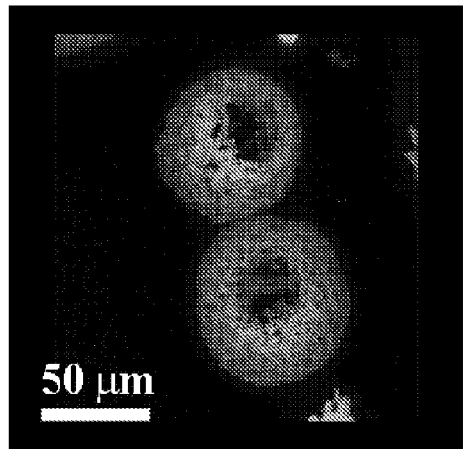
FIGS. 15A and 15B are, respectively, a 3D confocal image of the NF-HMS and a 2D cross-section confocal image of the NF-HMS.
Figure 15B:
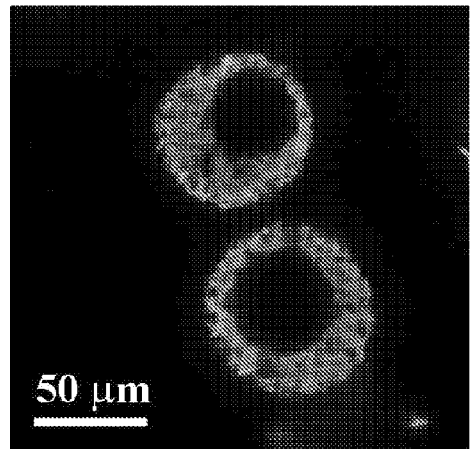

The star-shaped PLLA (SS-PLLA) was dissolved in THF at 0° C. with a concentration of 2.0% (wt/v). Under rigorous mechanical stirring (speed 7, MAXIMA, Fisher Scientific Inc.), glycerol (50° C., in a dispersion media including FITC-labeled 3-amino-1,2-propanediol and glycerol mixed with a v/v ratio of 1/10) with three times the volume of the SS-PLLA solution was gradually added into the SS-PLLA solution, and the stirring continued for 5 minutes afterwards. The mixture was then quickly poured into liquid nitrogen. After 10 minutes, a water-ice mixture (1000 mL) was added for solvent exchange for 24 hours. The spheres were sieved and washed with excessive distilled water for 6 times to remove glycerol residue on the spheres surfaces. The spheres were then lyophilized for 3 days. The SEM images of these microspheres are shown in FIGS. 10A through 10C (where the fibers are shown as having an average diameter of about 160 nm), a 3D confocal image of two of the microspheres is shown in FIG. 15A, and a 2D cross-section confocal image of the two microspheres of FIG. 15A are shown in FIG. 15B.

Figure 16:
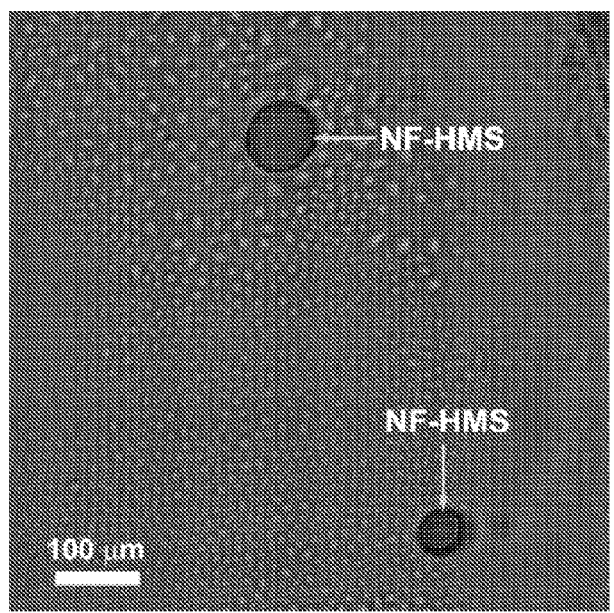
FIG. 16 is a fluorescence image of NF-HMS, showing glycerol inside the microspheres.

During fabrication of the microspheres in this Example, it was found that glycerol was encapsulated inside the microspheres after the emulsification and phase separation procedures (see FIG. 16). FIG. 16 is a fluorescence image of nano-fibrous hollow microspheres, showing glycerol inside the microspheres. After emulsification and phase separation at −76° C. for 4 hours, the specimen was cut into slices with a thickness of 100 μm at −40° C. using a Cryostat and was quickly observed under a fluorescence microscope. The image showed that the nano-fibrous hollow microspheres were surrounded by FITC-labeled dispersion media (FITC-labeled 3-amino-1,2-propanediol and glycerol, which were mixed with a v/v ratio of 1/10). The green color inside the nano-fibrous hollow microspheres indicated that the glycerol mixture had been encapsulated inside the microspheres, which became the hollow core after being extracted by water and then freeze-dried. The dark shell of the microspheres was composed of star-shaped PLLA nano-fibers. The many bright droplets were the partially melted glycerol during the observation under the fluorescence microscope.

Figure 17A:
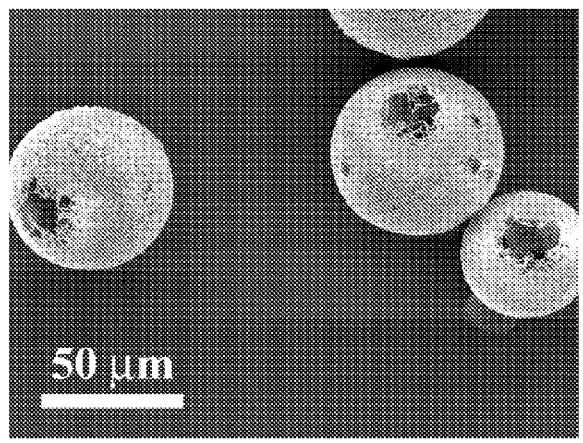
FIGS. 17A through 17C are SEM images of NF-HMS fabricated from star-shaped PLLA polymers which were initiated by generation 3 dendrimers (FIG. 17A), generation 4 dendrimers (FIG. 17B) and generation 5 dendrimers (FIG. 17C)
Figure 17B:
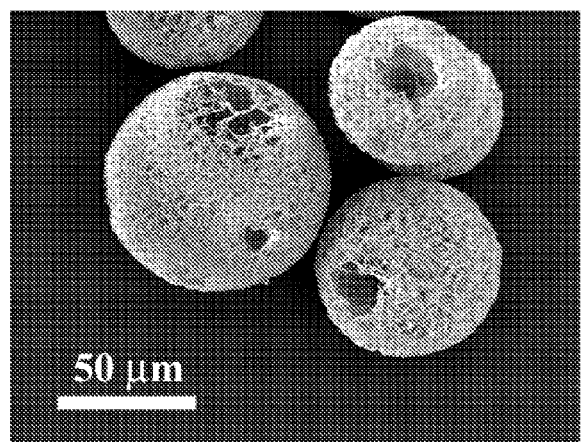
Figure 17C:
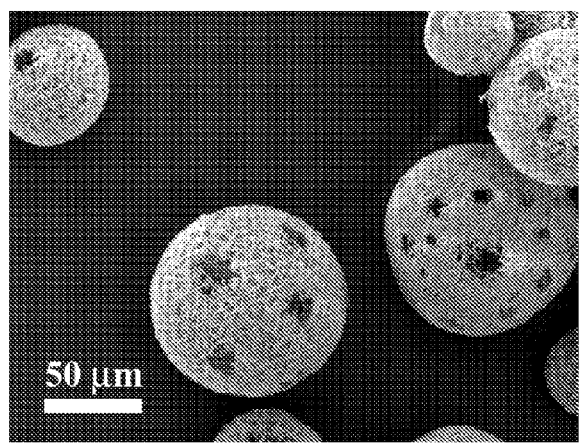

When higher generations of PAMAM (e.g., G3, G4, G5) were used to synthesize the SS-PLLA, the resulting microspheres (formed via the method described in this Example) were hollow and nano-fibrous (see, e.g., FIGS. 17A through 17C). FIG. 17A illustrates microspheres made with G3 PAMAM, FIG. 17B illustrates microspheres made with G4 PAMAM, and FIG. 17C illustrates microspheres made with G5 PAMAM. The size of all of the microspheres shown in these figures ranges from 40 μm to 100 μm.

Example 4

Blended PLLA and Star-Shaped PLLA Microspheres

Figure 18A:
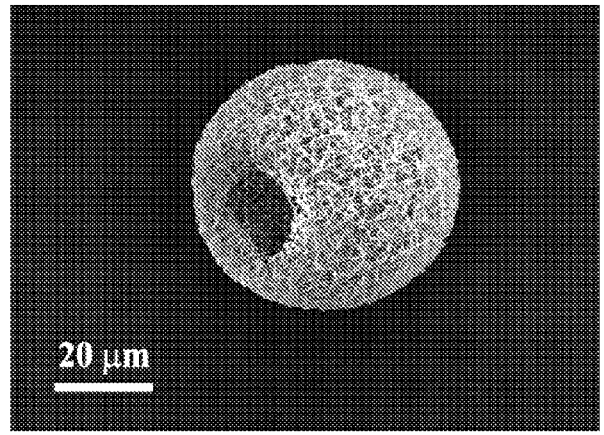
FIGS. 18A through 18C are SEM images of representative NF-HMS prepared by blending linear PLLA with SS-PLLA at ratios of 10:90 (FIG. 18A), 40:60 (FIG. 18B), 60:40 (FIG. 18C)
Figure 18B:
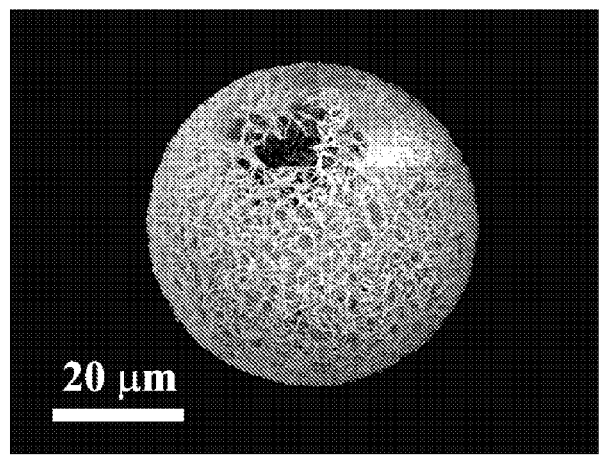
Figure 18C:
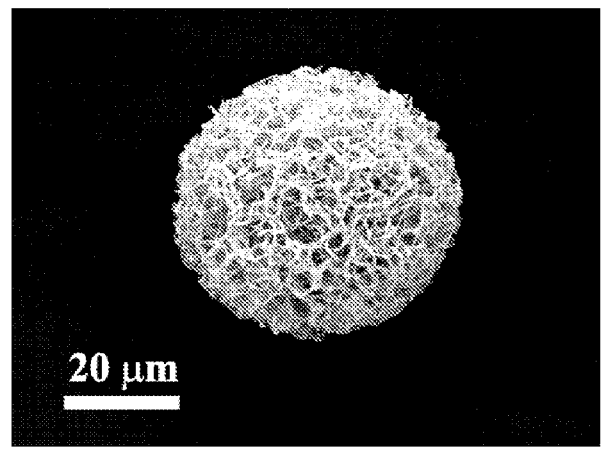

The star-shaped PLLA (formed in Example 3) was blended with PLLA to prepare microspheres using the technique described in Example 3. It was found that SS-PLLA had great compatibility with PLLA. Typical nano-fibers formed at any ratio of SS-PLLA/PLLA, while the mixture ratio between PLLA and SS-PLLA had significant effects on the resulting microsphere structure. Ratios of 10:90, 40:60, and 60:04 PLLA:SS-PLLA were tested, and the resulting microspheres are shown FIGS. 18A though 18C. As illustrated, at a low PLLA/SS-PLLA ratio (e.g., 10:90 and 40:60), nano-fibrous hollow microspheres were formed (see FIGS. 18A and 18B), where the inner core is smaller when more linear PLLA is used. As the ratio of PLLA/SS-PLLA increased to 60:40, the hollow structure disappeared, but the nano-fibrous structure remained (see FIG. 18C).

Comparative Example

Solid-Walled PLLA Microspheres

Figure 19:
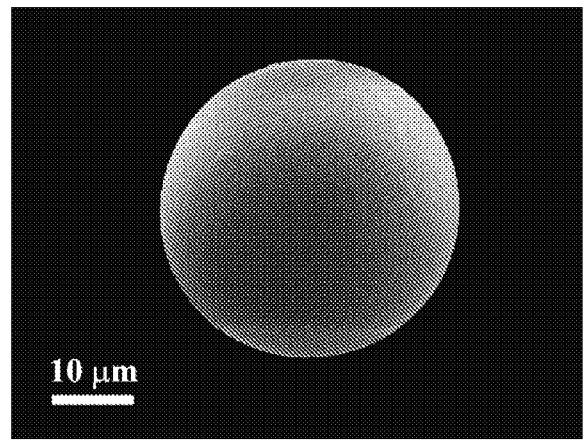
FIG. 19 is a SEM image of a representative solid-interior or solid-walled microsphere (SI-MS)

Solid-walled PLLA microspheres were prepared by a traditional solvent evaporation technique for comparison with the other Examples. PLLA (linear PLLA with an inherent viscosity of about 1.6 dl/g) was first dissolved in dichloromethane at room temperature with a concentration of 2.0% (wt/v). The PLLA solution was added to 20-folds of PVA solution (2.0% (wt/v)). The mixture was stirred (500 rpm) for 24 hours at room temperature and the formed microspheres were collected by centrifugation. The microspheres were washed six times with excessive water. The obtained microspheres were lyophilized for 3 days. The SEM image of one of these microspheres is shown in FIG. 19.

Comparison of Example 1

Example 3 and Comparative Example

The solid-interior PLLA microspheres of the Comparative Example had a smooth surface (see FIG. 10). In contrast, the nano-fibrous microspheres of Example 1 had a fibrous and porous surface (see FIG. 2) and the nano-fibrous microspheres of Example 3 had a fibrous and porous surface along with a hollow core (see FIGS. 10A-10C).

Various characteristics of the microspheres formulated in Examples 1 and 3 and the Comparative Example are given in Table 3. Due, at least in part, to the nano-fibrous and the hollow architecture, the microspheres of Example 3 had an overall density of 0.043 g/cm³. This was less than 1/30 of the density of the microspheres of the Comparative Example and less than ½ of the density of the microspheres of Example 1. The surface area of the microspheres of Example 3 was 120.70±0.91 m²/g, which was similar to that of the microspheres of Example 1, but was more than three orders of magnitude higher than that of the microspheres of the Comparative Example.

TABLE 3

Comparison of Example 1 (NF-MS), Example 3 (NF-HMS), and Comparative Example (SI-MS)[a]

| Microspheres | Surface area (m²/g) | Porosity (%) | Overall density (g/cm³) | Fiber diameter (nm) | Fiber length (nm) |
|---|---|---|---|---|---|
| NF-HMS[b] | 120.70 ± 0.91 | 96.66 ± 1.29 | 0.043 | 160 ± 67 | 1700 ± 334 |
| NF-MS[c] | 119.32 ± 1.26 | 92.10 ± 0.84 | 0.100 | 162 ± 49 | 1645 ± 420 |
| SI-MS[d] | 0.09 ± 0.03 | 0.32 ± 0.24 | 1.256 | — | — |

[a] As set forth above, all spheres were fabricated at a concentration of 2.0% (wt/v).
[b] As set forth above in Example 3, NF-HMS were fabricated from SS-PLLA (G2, $M_{n(branch)}$ = 6600, $M_{n(SS\text{-}PLLA)}$ = 69300)
[c] As set forth above in Example 1, NF-MS were fabricated from linear PLLA which has a molecular weight of 107,000 (an inherent viscosity of approximately 1.6 dl/g, Boehringer Ingelheim GmbH, Ingelheim, Germany).
[d] As set forth above in the Comparative Example, SI-MS were fabricated from linear PLLA which has a molecular weight of 107,000 (an inherent viscosity of approximately 1.6 dl/g, Boehringer Ingelheim GmbH, Ingelheim, Germany).

In Vitro and In Vivo Experiments and Results for Example 1, Example 3 and Comparative Example The microspheres of Example 1 (NF-MS), Example 3 (NF-HMS), and the Comparative Example (SI-MS) were tested as injectable scaffolds for cartilage regeneration. Three experimental models were employed to evaluate the cartilage formation using the microsphere/chondrocyte suspensions: (I) In vitro cartilage formation; (II) Subcutaneous injection in nude mice for ectopic cartilage formation; and (III) Rabbit osteochondral defect repair. Neo-cartilage generated from the NF-HMS/chondrocyte constructs was also evaluated for mechanical properties.

Cartilage Tissue Formation In Vitro

Microspheres of each Example and the Comparative Example with a diameter of 20-60 μm were used to engineer cartilage. The chondrocytes ($2 \times 10^6$/ml) were mixed with the NF-HMS, the NF-MS, and the SI-MS (chondrocytes/microspheres=10/1) and were transferred into a tube at an angle of 20° to the horizontal plane with a perforated cover to allow gas exchange on a slow rotating shaker (20 rpm).

The chondrocytes/microspheres constructs were cultured in vitro for up to 4 weeks. At different time points, the new cartilage constructs were harvested and analyzed histologically and biochemically. To engineer cartilage with an anatomical shape, a silicone mold (prepared with Sylgard 184 silicone elastomer kit, Dow Corning Corporation, USA) with the shape of a rat femur condyle was placed into a 12-well cell culture plate covered with a layer of 0.5% agarose on the plate bottom surface. The solidification of the agarose fixed the mold to the well. The chondrocytes/microspheres suspension ($2 \times 10^6$ cells and $2 \times 10^5$ NF-HMS) with a volume of 50 μA was delivered to the silicone mold and cultured in vitro.

Figure 20:
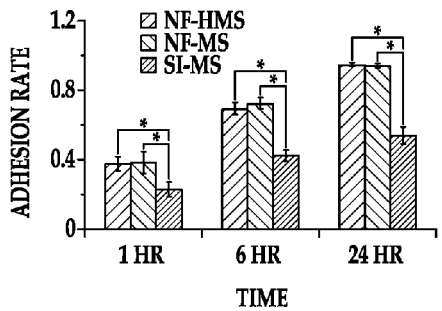
FIG. 20 is a graph comparing chondrocytes adhesion on microspheres (NF-HMS, NF-MS, and SI-MS) by measuring the DNA content using Hoechst 33258 dye at various times (* $p<0.05$)

It was observed that chondrocytes were readily attached to both the NF-MS and the NF-HMS. 24 hours after cell seeding, about 100% of the chondrocytes were attached to the NF-MS and the NF-HMS, while less than 60% of the chondrocytes were attached to the SI-MS (see FIG. 20). The high attachment efficiency of the cells on the NF-MS and the NF-HMS was attributed to their nano-fibrous architecture, which had high surface area and could adsorb cell adhesion proteins (such as fibronectin and vitronectin) at significantly higher levels than the smooth surface microspheres.

Figure 21A:
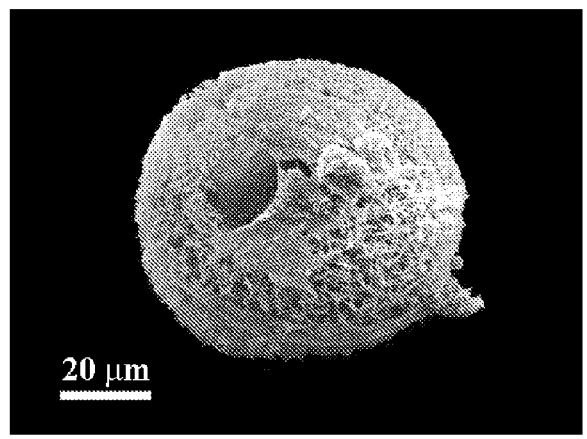
Figure 21B:
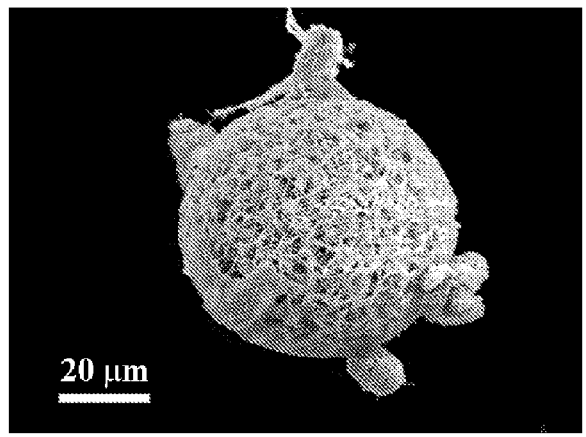

The chondrocytes on both the NF-HMS and the NF-MS exhibited a more rounded morphology while the chondrocytes were flat and wide-spread on the surface of the SI-MS (see FIGS. 21A through 21C). Further, a significant number of cells migrated inside the NF-HMS. The rounded cell shape enhances the maintenance of the chondrocytic phenotype, while a flat morphology promotes the de-differentiation of the chondrocytes.

Figure 22:
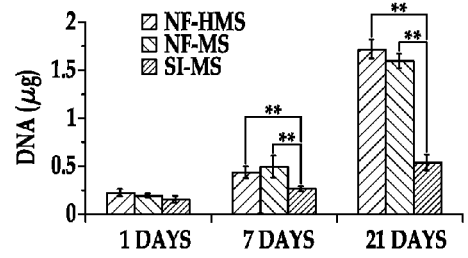
FIG. 22 is a graph illustrating proliferation of chondrocytes on NF-HMS, NF-MS and SI-MS in spinner flask culture, the DNA content was quantified by using Hoechst 33258 dye.
Figure 23:
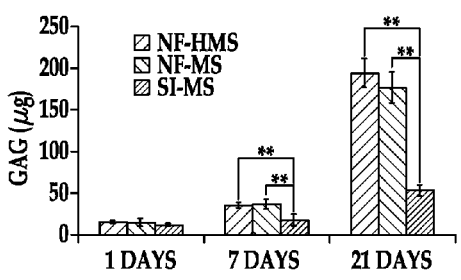
FIG. 23 is a graph illustrating glycosaminoglycan (GAG) content of NF-HMS, NF-MS and SI-MS constructs after various times in culture, where GAG was measured by dimethylmethylene blue method.
Figure 24:
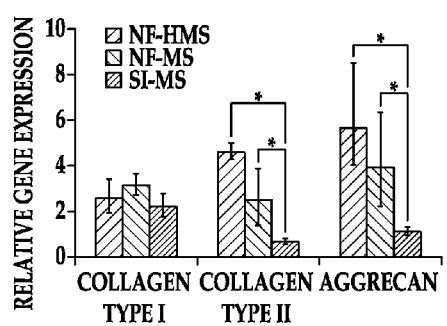
FIG. 24 is a graph illustrating chondrogenic gene expression after cultured in vitro for 3 weeks, where the values were quantified by real-time PCR and were expressed as the ratio of mRNA in spinner flask culture to that of passage II chondrocyte.

The chondrocytes seeded on both the NF-HMS and the NF-MS had significantly higher proliferation rates and produced higher amounts of glycosaminoglycans (GAG) than those on the SI-MS (see FIGS. 22 and 23). After 3 weeks, the cartilage-specific genes (aggrecan and collagen type-II) were down-regulated and the gene of collagen type-I was up-regulated on the SI-MS sample (see FIG. 24). In contrast (and as shown in the graph of FIG. 24), continuous expression of aggrecan and collagen type-II genes at high levels was detected on the NF-HMS and NF-MS samples, suggesting the capability of nano-fibrous architecture to retain the chondrocyte phenotype.

For clinical applications, injectable/moldable scaffolds are needed to fill cartilage defects often with irregular geometries. To test the capacity of the NF-HMS as an injectable scaffold to fill cartilage defects, NF-HMS were mixed with chondrocytes and were injected into a mold with the shape of a rat femural condyle. After 4 weeks of incubation in vitro, a piece of glistening new cartilage tissue with the identical shape of the rat femur condyle was harvested (see FIG. 25). The histological results revealed a homogeneous distribution of NF-HMS inside the tissue (FIGS. 26A and 26B). The Safranin-O (FIG. 26A) and immunohistochemical (FIG. 26B) staining indicated that the NF-HMS were surrounded by abundant amounts of GAG and type II collagen. These in vitro results demonstrated the capability of the NF-HMS as an injectable scaffold to fill cartilage defects with complex geometries.

Subcutaneous Injection of Chondrocytes and Microspheres

All animal procedures were carried out under the guidelines of the Institutional Animal Care and Use Committee of the University of Michigan. Nude mice (6-8 weeks old, NU/NU, Charles River laboratories Inc, USA) were anesthetized with 2.5% isoflurane in balanced oxygen. Chondrocytes (from New Zealand white rabbits, passage 2) were mixed with the microspheres (NF-HMS, NF-MS, and SI-MS) to form a suspension. The chondrocytes/microspheres suspension was injected into the subcutaneous pockets on each side lateral to the dorsal midline using a 25-gauge needle. Each mouse received two injections with each injection containing $4 \times 10^6$ cells (0.2 mL) mixed with microspheres. Two separate experiments (using the same mass of microspheres and using the same number of microspheres) were performed. In each experiment, the injections were randomly arranged and 8 nude mice were used, which allowed four specimens in each group (the NF-HMS, the NF-MS, the SI-MS, and the chondrocytes alone).

After 8 weeks in vivo, the new cartilage tissues were harvested and the fibrous capsules were removed. The samples were weighted and used for biochemical, histological and immunohistochemical examinations.

Figure 27:
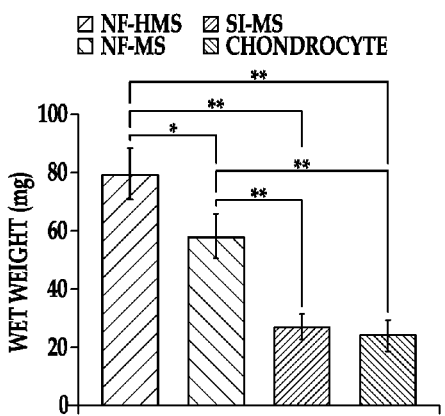
FIG. 27 is a graph illustrating the wet weight of ectopically engineered cartilage tissue from the same number of chondrocytes and the same mass of different types of microspheres (NF-HMS, NF-MS, and SI-MS) after 8 weeks of subcutaneous implantation.

While all of the harvested samples were white and glistening in gross appearance, the tissue sizes were significantly different. The average tissue mass formed from the chondrocyte/NF-HMS group (after 8 weeks of implantation) was 36.9% higher than that formed from the chondrocyte/NF-MS group, 197.3% higher than that formed from the chondrocyte/SI-MS group, and 235.0% higher than that formed from the chondrocytes alone control group (FIG. 27).

Figure 28A:
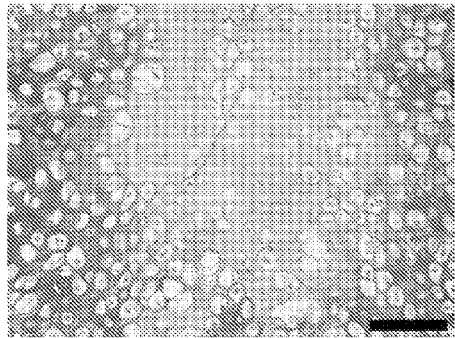
FIGS. 28A through 28D and 28F are sections of the ectopically engineered cartilage tissue from the same number of chondrocytes and the same mass of different types of microspheres stained with Safranin-O for proteoglycans 8 weeks after subcutaneous injection, where
Figure 28B:
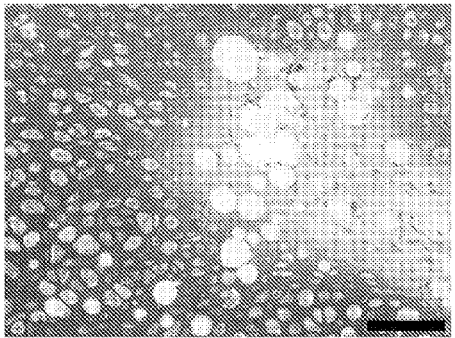
Figure 28C:
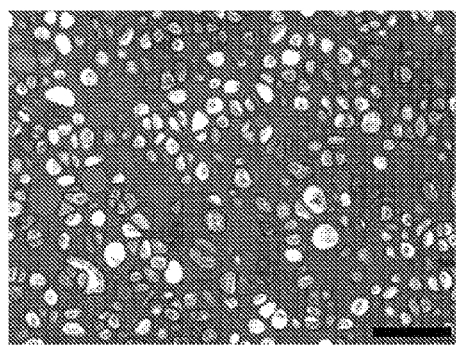
Figure 28D:
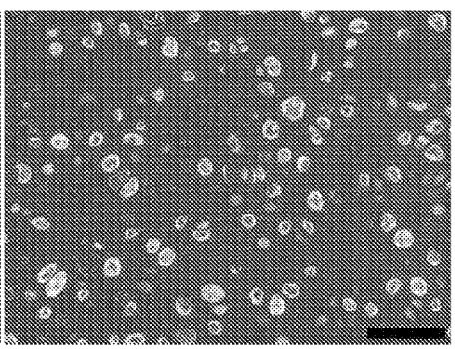
Figure 28E:
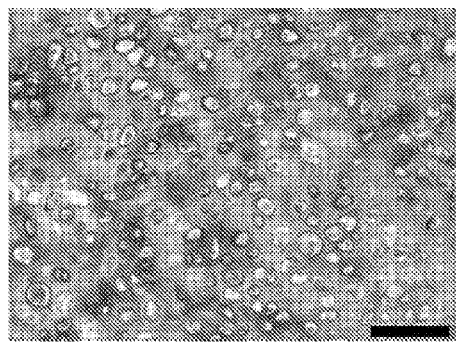
FIG. 28E is the NF-HMS/chondrocytes group stained with immunohistochemical staining for collagen type II, where the scale bar represents 100 µm, * $p<0.05$, ** $p<0.01$.
Figure 28F:
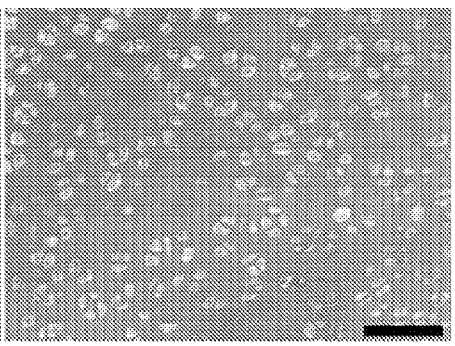

Histological examination showed that the tissue formed from the simple chondrocytes injection was hypercellular and consisted of larger areas of fibrous tissue, which was stained negative with Safranin-O (FIG. 28A). Most of the SI-MS aggregated and stained weakly by Safranin-O, indicating poor cartilage tissue formation (FIG. 28B). In contrast, the NF-HMS and the NF-MS were uniformly distributed throughout the new tissues. The histology and immunohistochemical staining indicated that sulfate proteoglycan (FIGS. 28C and 28D and type II collagen (FIG. 28E) were evenly distributed throughout the NF-HMS and the NF-MS specimens. FIG. 28F illustrates a control sample of native rabbit knee cartilage.

Figure 29:
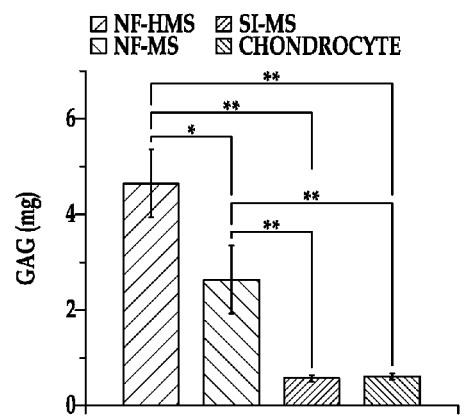
FIG. 29 is a graph illustrating the GAG production of the ectopically engineered cartilage tissue from the same number of chondrocytes and the same mass of different types of microspheres (NF-HMS, NF-MS, and SI-MS) after 8 weeks of subcutaneous implantation.
Figure 30:
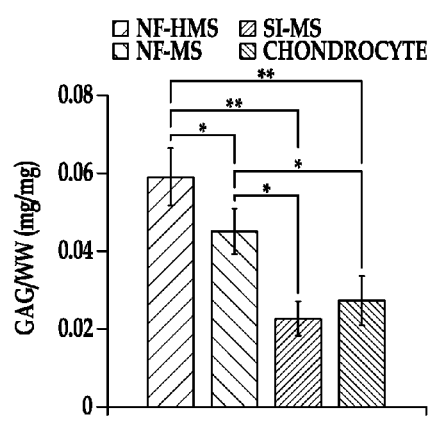
FIG. 30 is a graph illustrating the GAG/wet-weight ratio of the ectopically engineered cartilage tissue from the same number of chondrocytes and the same mass of different types of microspheres (NF-HMS, NF-MS, and SI-MS) after 8 weeks of subcutaneous implantation.
Figure 31:
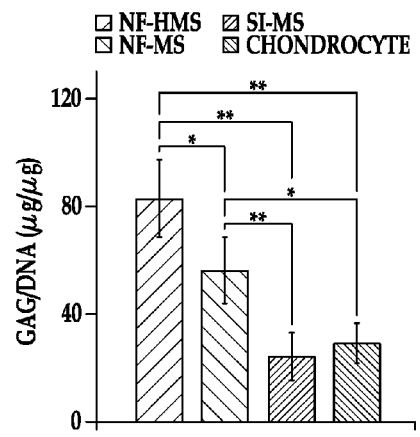
FIG. 31 is a graph illustrating the GAG/DNA ratio of the ectopically engineered cartilage tissue from the same number of chondrocytes and the same mass of different types of microspheres (NF-HMS, NF-MS, and SI-MS) after 8 weeks of subcutaneous implantation.
Figure 32:
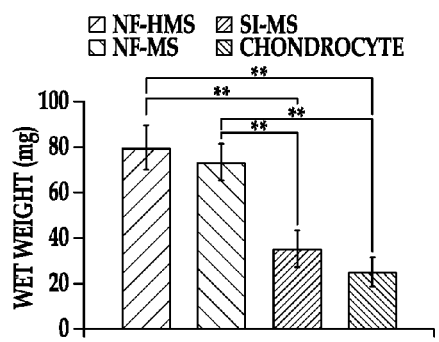
FIG. 32 is a graph illustrating the wet weight of in vivo cartilage tissue formed from the same number of microspheres (NF-HMS, NF-MS, or SI-MS)
Figure 33:
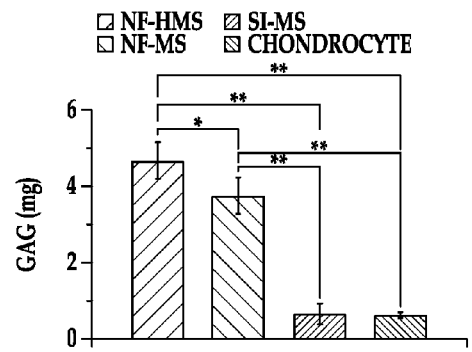
FIG. 33 is a graph illustrating the GAG production of the in vivo cartilage tissue formed from the same number of microspheres (NF-HMS, NF-MS, or SI-MS)
Figure 34:
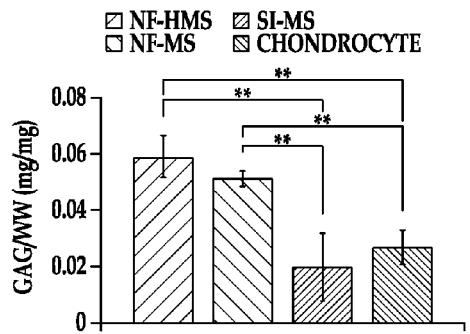
FIG. 34 is a graph illustrating the GAG/wet-weight ratio of the in vivo cartilage tissue formed from the same number of microspheres (NF-HMS, NF-MS, or SI-MS)
Figure 35:
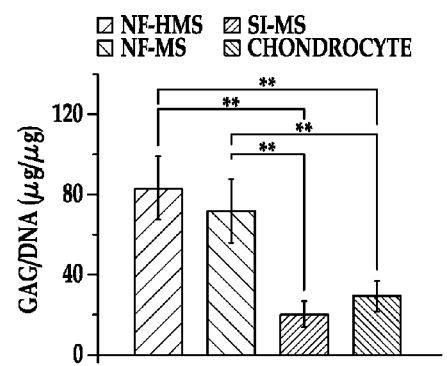
FIG. 35 is a graph illustrating the GAG/DNA ratio of the in vivo cartilage tissue formed from the same number of microspheres (NF-HMS, NF-MS, or SI-MS)

Biochemical quantification showed that both the GAG/wet-weight (ww) and the GAG/DNA ratios of the NF-HMS group were significantly higher than those of the NF-MS, the SI-MS, and the chondrocytes alone groups (see FIGS. 29 and 30). Furthermore, the DNA/ww ratio of the NF-HMS was significantly lower than those of the NF-MS, the SI-MS, and the chondrocytes alone groups (FIG. 31). Among the four groups, the average DNA/ww ratio of the NF-HMS group was the closest to that of the native cartilage.

Figures 36A, 36B, 36C, 36D:
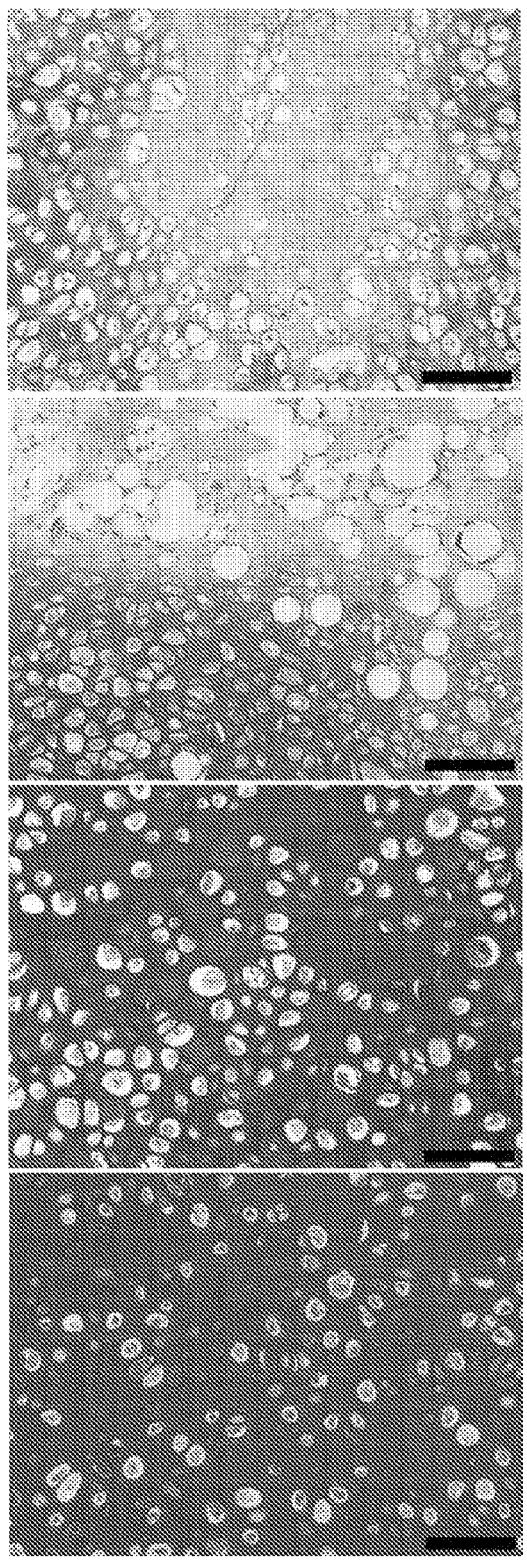
FIGS. 36A through 36D are sections of the in vivo cartilage tissue formed from the same number of microspheres stained with Safranin-O for proteoglycans 8 weeks after subcutaneous injection, where

Similar results in terms of histological and biochemical analyses were obtained when the same number of microspheres (NF-HMS, NF-MS, and SI-MS) was used in the ectopic cartilage regeneration model. As shown in FIGS. 32-35, the NF-HMS and NF-MS specimens had significantly higher tissue mass (FIG. 32), GAG production (FIG. 33), GAG/DNA (FIG. 34) and GAG/ww (FIG. 35) than the SI-MS and the simple chondrocyte injection. Further, the NF-HMS specimen had a significantly higher GAG accumulation than the NF-MS. Tissue sections were stained with Safranin-O for proteoglycan synthesis. The simple chondrocytes injection at 8 weeks is shown in FIG. 36A, the SI-MS/chondrocytes at 8 weeks are shown in FIG. 36B, the NF-MS/chondrocytes at 8 weeks are shown in FIG. 36C, and the NF-HMS/chondrocytes at 8 weeks are shown in FIG. 36D. All of the samples were stained positively with Safranin-O. Both the NF-HMS and the NF-MS were uniformly distributed in the cartilage tissue in which chondrocytes were embedded in the lacunae surrounded by the GAG-positive ECM. After 8 weeks in vivo culture, most of the NF-HMS degraded and the spaces were occupied by newly synthesized matrix. The SI-MS clustered together, which led to poor cartilage formation. Tissues from the simple chondrocyte injection appeared hypercellular and some fibrous tissue formation was observed in the central part of the specimens. In FIGS. 36A through 36D, the microspheres may appear to have a range of sizes due to a difference in the plane of sectioning.

Figure 37:
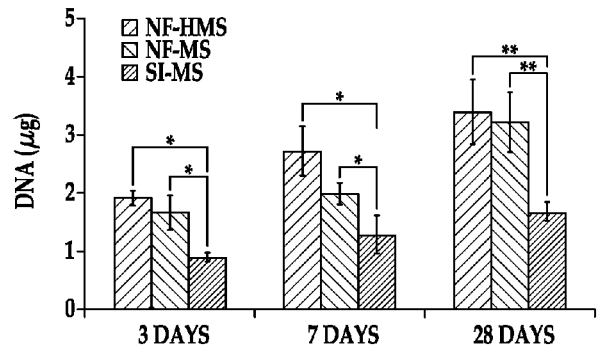
FIG. 37 is a graph illustrating the proliferation of chondrocytes on NF-HMS, NF-MS and SI-MS used in in vitro cartilage tissue formation experiments.
Figure 38:
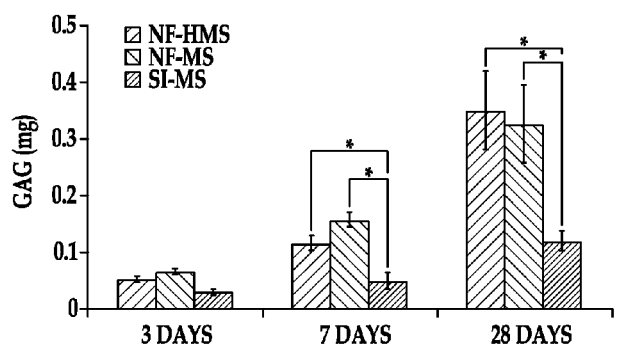
FIG. 38 is a graph illustrating the glycosaminoglycan (GAG) content of NF-HMS, NF-MS and SI-MS specimens used in the in vitro cartilage tissue formation experiments after cultured for 3, 7, and 28 days.

These results were also consistent in trend with the in vitro results (see FIGS. 37 through 39 for the in vitro results). FIG. 37 shows the proliferation of chondrocytes on NF-HMS, NF-MS and SI-MS. As illustrated, the cell numbers on the NF-HMS and the NF-MS were significantly higher than those on the SI-MS, and the average cell numbers on the NF-HMS specimens were slightly higher than those on the NF-MS specimen. FIG. 38 shows the glycosaminoglycan (GAG) content of NF-HMS, NF-MS and SI-MS specimens after cultured for 3, 7, and 28 days. While the GAG content increased with time for all specimens tested in vitro, the NF-HMS and the NF-MS specimens always had significantly higher GAG contents than the SI-MS specimens. FIGS. 39A through 39F illustrate Safarin-O or immunohistochemical staining for collagen type II of the various microspheres tested in vitro. In particular, FIG. 39A shows the Safranin-O staining of a NF-MS specimen, FIG. 39B shows the immunohistochemical staining of a NF-MS specimen for collagen type II, FIG. 39C shows the Safranin-O staining of a NF-HMS specimen, FIG. 39D shows the immunohistochemical staining of a NF-HMS specimen for collagen type II, FIG. 39E shows the Safranin-O staining of a SI-MS specimen, and FIG. 39F shows the immunohistochemical staining of a SI-MS specimen for collagen type II. The Safranin-O staining and immunohistochemical staining revealed that the NF-HMS and the NF-MS were uniformly distributed in the tissues, and chondrocytes were embedded in the lacunae surrounded by the cartilage specific extracellular matrix. In contrast, most of the SI-MS clustered together and poor cartilage formation was observed. Further, some cells were observed to invade into the holes of the NF-HMS, which had deformed and become irregular after 4 weeks of culture. In FIGS. 39A through 39F, the microspheres may appear to have a range of sizes due to a difference in the plane of sectioning.

The outcome differences among the different microspheres could be attributed to the nano-fibrous architecture (which enhances cartilage differentiation and regeneration in a non-injectable nano-fibrous scaffold), the overall low material densities, and the high surface areas of the NF-HMS and the NF-MS (which likely facilitate cell-scaffold interactions and mass transfer for tissue regeneration). The faster degradation rate of the NF-HMS and their hollow structure likely provided additional space for the matrix accumulation, facilitating cartilage tissue formation.

At an earlier time point (4 weeks after implantation), many NF-HMS had partly degraded and became irregular in shape and smaller in size, and the void spaces were occupied by the migrated chondrocytes and the newly synthesized ECM (data not shown). In contrast, all the NF-MS and the SI-MS were still in the tissue with a round shape due to their slow degradation rate. After 8 weeks, most of the NF-HMS had degraded and abundant cartilage-specific matrix (GAG and type-II collagen) had been deposited into the void spaces. In contrast, all the NF-MS and the SI-MS were still in the tissues with round shapes after 8 weeks of implantation. When compared with the SI-MS and the NF-MS, the NF-HMS group had a significantly lower average cell density and a larger average amount of new tissue matrix, which is more similar to the native rabbit cartilage (see FIGS. 28C, 28D, and 28F).

Rabbit Osteochondral Defect Repair

Four female three-month-old New Zealand white rabbits (Harlan Spraugue Dawley Inc, USA) were utilized. The rabbits were anesthetized with an intramuscular injection of a mixture of 150 mg ketamine hydrochloride (Ketaset III, Fort Dodge, USA), 35 mg xylazine hydrochloride (LLOYD laboratories, USA) and 5 mg acepromizine (Boehringer ingelheim vetmedica inc. USA). A medial parapatellar incision was made so that the knee joint was exposed. The patella was dislocated laterally and the anterior articular surface of the distal femur was exposed. A 5 mm diameter full-thickness cylindrical osteochondral defect (2-3 mm deep) was made using an electrical drill in the femoral articular surface of the femoral patellar groove. After irrigating the joint with sterile isotonic saline, a 6×6 mm flap was removed from the fascia overlying the quadriceps muscle and sutured to the peripheral rim of the artificial defect with 6-0 gut-suture (Gut chromic, Hu-Friedy, USA). The cultured chondrocytes (passage II, $2 \times 10^7$ cells/mL) and the NF-HMS (1.4 mg/mL) in the DMEM (i.e., Dulbecco's Modified Eagle Medium) were mixed and injected into the defects. For each injection, 0.08 ml of the chondrocyte/NF-HMS suspension was delivered (n=4). The negative control defects received 0.08 mL DMEM medium (n=4). Samples were harvested and evaluated 8 weeks after surgery.

Figure 40A:
FIGS. 40A and 40B are images of the gross appearance of rabbit osteochondral defect repair eight weeks after NF-HMS/chondrocytes injection, and the gross appearance of a negative control group, respectively.
Figure 40B:
Figure 41A:
FIGS. 41A and 41B illustrate, respectively, immunohistochemical staining for collagen type II of the NF-HMS/chondrocyte group and the negative control group, where the negative control group demonstrated only small areas of fibrocartilage tissue formation (scale bars represent 500 µm)
Figure 41B:
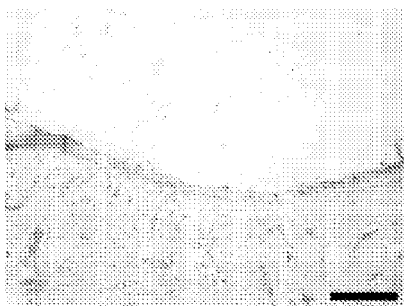
Figure 41C:
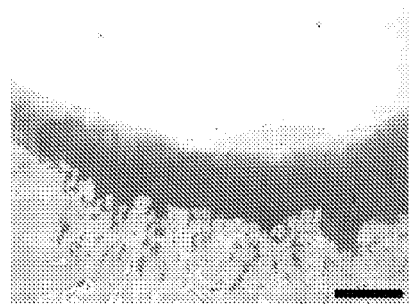
FIGS. 41C and 41D illustrate, respectively, Safranin-O staining of the NF-HMS/chondrocytes group (which demonstrated de novo hyaline cartilage formation in defects) and the negative control group (scale bars represent 500 µm)
Figure 41D:
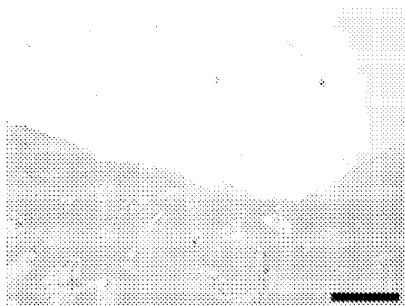
Figure 41E:
FIG. 41E illustrates the newly formed tissue of the samples shown in FIG. 41C; the new tissue integrated well into the host cartilage tissue and subchondral bone (scale bar represents 200 µm)

FIGS. 40A and 40B illustrate, respectively, the gross appearance of rabbit osteochondral defect repair eight weeks after NF-HMS/chondrocytes injection, and the gross appearance of the negative control group. In the control group (FIG. 40B), the reparative tissue formed within the defect was peripherally white and depressed in the center. The immunohistochemical and Safranin-O results for the control defects showed small areas of fibrocartilage tissue formation (see FIGS. 41B and 41D, respectively). In contrast and as shown in FIG. 40A, the regenerated tissue in the NF-HMS group was smooth and exhibited white glistening coloration. Safranin-O staining showed a high GAG content in the reparative cartilage (see FIG. 41C). The reparative cartilage also had a strong positive staining for type-II collagen (see FIG. 41A). At a higher magnification, the regenerated cartilage displayed favorable chondrocyte morphology and cartilage-specific matrix (see FIG. 41E). FIGS. 41A, 41C, and 41E illustrate de novo hyaline cartilage formation in the defects. Unlike typical implanted tissues and hydrogels, the NF-HMS regenerates high quality cartilage that integrated well with host cartilage and subchondral bone (see FIGS. 41C and 41E).

Figure 42A:
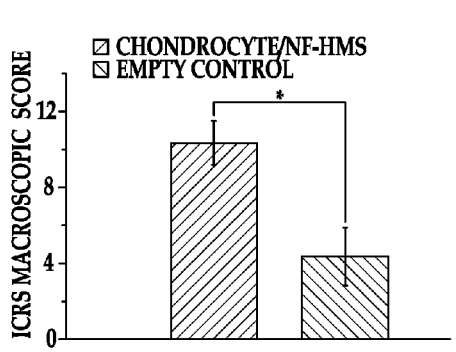
FIGS. 42A and 42B are graphs illustrating international cartilage repair society (ICRS) macroscopic and visual histological scores for the NF-HMS/chondrocytes group and the control groups.
Figure 42B:
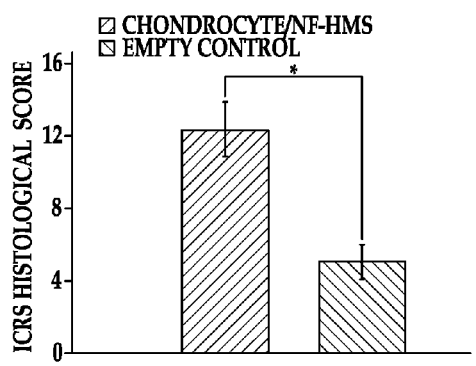

As shown in FIGS. 42A and 42B, when evaluated by the international cartilage repair society (ICRS) visual histological scoring system, the NF-HMS group had significantly higher macroscopic and histological scores than the control group.

Biomechanical Properties of NF-HMS/Chondrocyte Constructs

The biomechanical properties of the engineered cartilage were tested because these properties are key in the functional performance of the cartilage (e.g., to transmit and distribute loads between bones).

The neo-cartilage regenerated from the NF-HMS/chondrocyte constructs was compared to a poly(ethylene glycol) (PEG) hydrogel, a PEG/chondrocyte construct, and native rabbit cartilage. To form the PEG/chondrocyte constructs, chondrocytes were encapsulated in a PEG hydrogel. Poly (ethylene glycol) diacrylate macromonomer (PEGDA, $M_n$=3400) was dissolved in phosphate buffered saline (PBS, pH 7.4) to a final concentration of 15% (w/w). The PEGDA solution was directly added to the chondrocytes and the cell density was adjusted to $2 \times 10^7$ cells ml$^{-1}$. IRGACURE® 2959 photoinitiator (Ciba Specialty Chemicals Co., Basel, Switzerland) was prepared in 70% ethanol and added to the macromonomer/chondrocytes mixture at a concentration of 0.05% (w/v). 0.2 ml of the PEG/chondrocytes mixture (containing $4 \times 10^6$) was then injected into a subcutaneous pocket of a nude mouse. Each mouse received two injections and was irradiated with a UV light (365 nm) at an intensity of 10 mW/cm$^2$ for 5 minutes under a UV lamp. For the NF-HMS/chondrocyte constructs, the same number of chondrocytes ($4 \times 10^6$) was mixed with 0.3 mg of nanofibrous hollow microspheres (Example 3) and injected into a subcutaneous pocket (0.2 ml of cell suspension with a concentration of $2 \times 10^7$ cells ml$^{-1}$) of a nude mouse as described above. The constructs were harvested after 8 weeks of implantation.

The biomechanical properties were measured using a confined compression chamber filled with culture medium and a MTS Synergie 200 mechanical tester (MTS Systems Corporation, Eden Prairie, Minn.). The dimensions of the specimens were about 5 mm in diameter and about 2 mm in thickness. These were cut out from the harvested neo-cartilage constructs. Confined compression and confined compressive stress relaxation were performed to determine the compressive modulus, aggregate modulus, and apparent permeability based on the biphasic theory.

Figure 43:
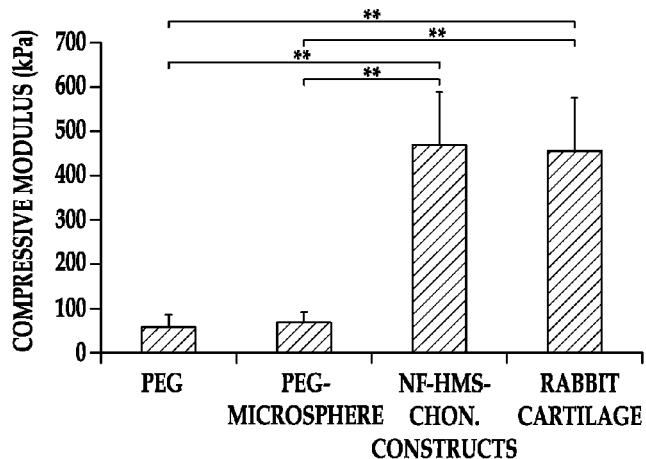
FIG. 43 is a graph depicting the compressive modulus for the NF-HMS/chondrocytes group and control groups.
Figure 44:
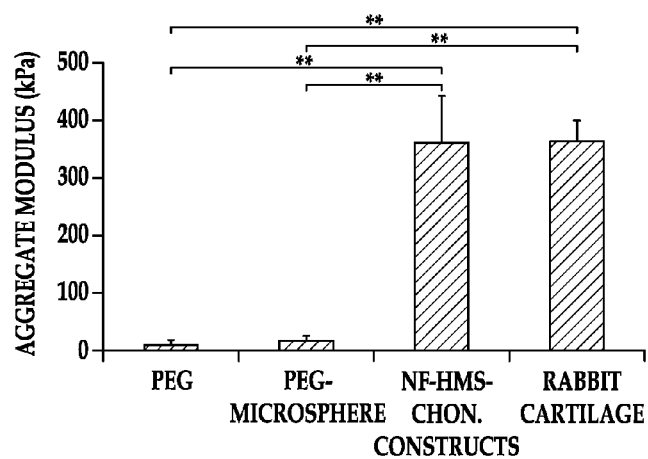
FIG. 44 is a graph depicting the aggregate modulus for the NF-HMS/chondrocytes group and control groups.
Figure 45:
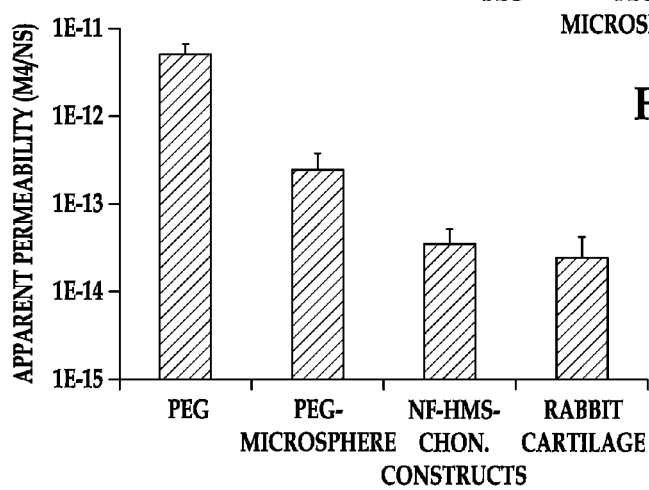
FIG. 45 is a graph depicting the apparent permeability
Figure 46A:
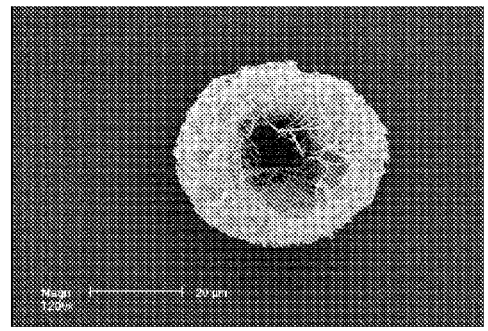
FIGS. 46A through 46D are SEM images of the structural degradation of NF-HMS in phosphate buffered saline (PBS) after 0 days, 7 days, 21 days, and 28 days, respectively.
Figure 46B:
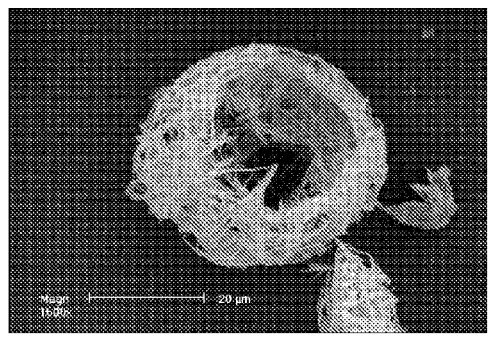
Figure 46C:
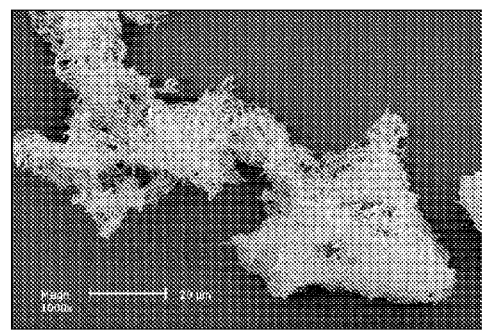
Figure 46D:
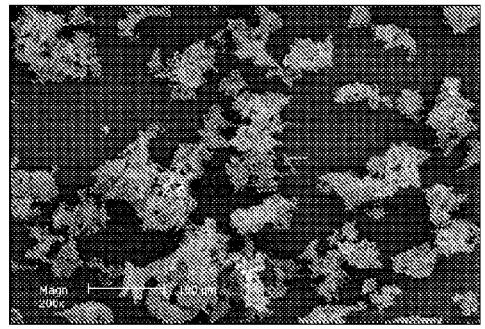

The neo-cartilage regenerated from the NF-HMS/chondrocyte constructs had significantly better mechanical properties than the PEG/chondrocyte constructs. The neo-cartilage from the NF-HMS/chondrocytes group had an average compressive modulus equivalent to that of native cartilage and 6.7-fold higher than that from the PEG/chondrocytes group (see FIG. 43). The aggregate modulus of the neo-cartilage from the NF-HMS/chondrocytes group was 19-fold higher than that from the PEG/chondrocytes group (see FIG. 44), which is the equilibrium modulus and more closely associated with the matrix composition. The aggregate modulus of the neo-cartilage from the NF-HMS/chondrocytes group reached that of the native rabbit cartilage (again see FIG. 44). The apparent permeability of the neo-cartilage from the NF-HMS/chondrocytes group was more than one order of magnitude lower than that of the PEG/chondrocytes group (see FIG. 45, indicating the very dense matrix formation in the NF-HMS/chondrocytes group. AS shown in FIG. 45, the apparent permeability of the neo-cartilage from the NF-HMS/chondrocytes group was not statistically different (p=0.36) from that of the native rabbit cartilage, which indicates that the dense matrix also allows for adequate mass transfer for its long-term survival and function.

Degradation of Hollow Nano-Fibrous PLLA Microspheres of Example 3

Figure 47:
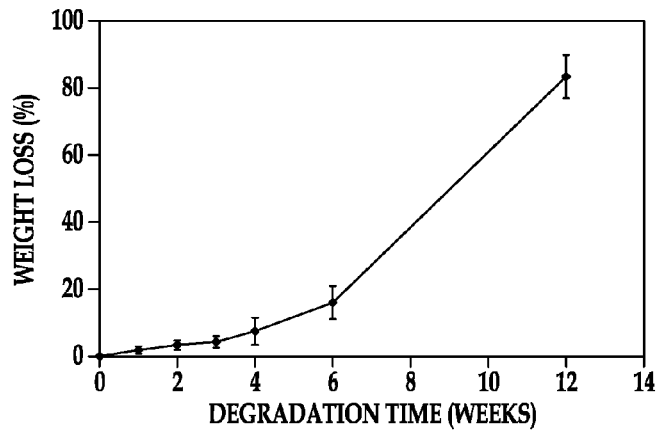
FIG. 47 is a graph illustrating the weight loss of NF-HMS in PBS at pH 7.4 and 37° C. over time.

100 mg of the hollow nano-fibrous PLLA microspheres (NF-HMS) of Example 3 were immersed in 1.0 mL PBS (pH 7.4, PBS) at 37° C. on a shaker (60 rpm). The buffer solution was changed every week. At preset time intervals (i.e., 0 days, 7 days, 21 days, and 28 days), the samples were collected and dried under vacuum at room temperature to constant weight. The morphology of the samples was examined under scanning electron microscopy. The structural degradation of the NF-HMS is shown in FIGS. 46A through 46D. The degradation was monitored as weight loss versus time, and the results are shown in FIG. 47.

Mineralized (Apatite) Nano-Fibrous PLLA Microspheres

Example 1A and Solid-Walled PLLA Microspheres (Comparative Example)

The microspheres of Example 1A and of the Comparative Example were washed with phosphate-buffered saline (PBS) and collected by centrifugation. The microspheres (200 mg) were incubated in 50 mL simulated body fluid (SBF) with a modified formulation that was prepared by dissolving NaCl, NaHCO$_3$, KCl, K$_2$HPO$_4$.H$_2$O, MgCl$_2$.H$_2$O, CaCl$_2$, and Na$_2$SO$_4$ in deionized water and buffered at a pH value of 7.4 at 37° C. with tri-(hydroxymethyl)aminomethane [(CH$_2$OH)$_3$CNH$_2$] and hydrochloric acid (HCl). The SBF solution was changed every other day. After incubation at 37° C. for a designated time period, the microspheres were removed from SBF, rinsed with distilled water twice overnight, and vacuum dried.

FIGS. 48A through 48H illustrate SEM micrographs of apatite growth on both the nanofibrous and solid-walled PLLA spheres after varying times of incubation in SBF. Substantial amounts of bone-like apatite crystals were formed on the Example 1A nanofibrous PLLA spheres after 10 days of incubation in SBF (see FIG. 48B). The formed apatite particles were a few hundred nanometers in size and had nano-structured surface features. The underlying nano-fibers became hardly observable after 20 days of incubation (see FIG. 48C). Further incubation in the SBF led to formation of a continuous apatite layer which covered the entire microsphere surface (see FIG. 48D). In comparison, the growth of apatite on the Comparative Example solid-walled PLLA microspheres was much slower. Very few scattered apatite crystals were formed after 10 days of incubation in SBF (see FIG. 48F). More apatite was formed on the solid-walled PLLA microspheres as incubation time increased (see, e.g., FIGS. 14G and 14H). However, unlike that of the nanofibrous microspheres, the solid-walled microspheres still had surface domains that were not covered by deposited apatite after 30 days of incubation (see FIG. 48H).

Figure 49:
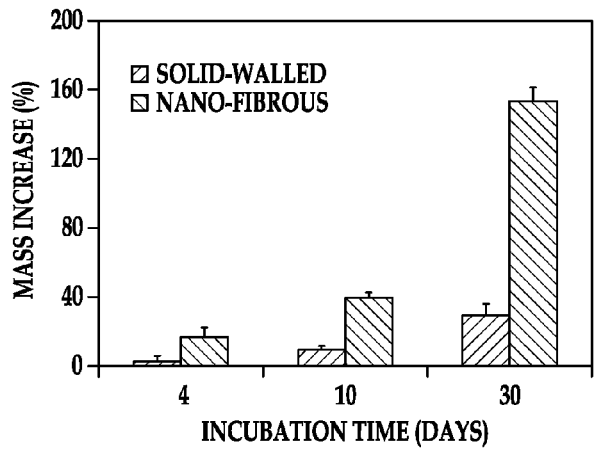
FIG. 49 is a graph illustrating the mass increase of the nano-fibrous PLLA microspheres (NF-MS formulated with 1% (wt/v)) and solid-walled PLLA microspheres (SI-MS) over incubation time in simulated body fluid.

As shown in the graph of FIG. 49, the quantitative analysis indicated that a significantly greater amount of apatite deposited on the nano-fibrous microspheres than that on the solid-walled microspheres.

Protein Adsorption and Release from Nano-Fibrous PLLA Microspheres (Example 1 and Example 1A and Other PLLA Concentrations) and Solid-Walled PLLA Microspheres (Comparative Example)

The microspheres of Example 1, Example 1A and the Comparative Example were first wetted with phosphate-buffered saline (PBS). Microspheres formulated with 4.0% (wt/v) PLLA solution and 6.0% (wt/v) PLLA solution were also formulated (according to the process outlined in Example 1) and tested. The wetted microspheres were incubated in protein solutions (for example, bovine serum albumin (BSA)) in PBS for 24 hours on an orbital shaker (e.g., at 50 or 60 rpm). After 24 hours of incubation, the microspheres were removed from the protein solution by centrifugation. The microspheres were washed three times with PBS to remove free and loosely adsorbed proteins. The adsorbed proteins on the microspheres were obtained by incubation in 1% sodium dodecyl sulfate (SDS) solution for 4 hours on an orbital shaker (60 rpm). The total amount of protein was measured using Micro BCA assay (Pierce, Rockford, Ill.). To determine the release profiles of proteins from microspheres, the protein-loaded microspheres (100 mg) were immersed in 1.0 mL PBS (pH 7.4) and incubated at 37° C. with continuous orbital rotation at 50 rpm or 60 rpm. At predetermined time intervals, samples were collected by centrifugation. The amount of released protein was determined by using Micro BCA assay.

Figure 50A:
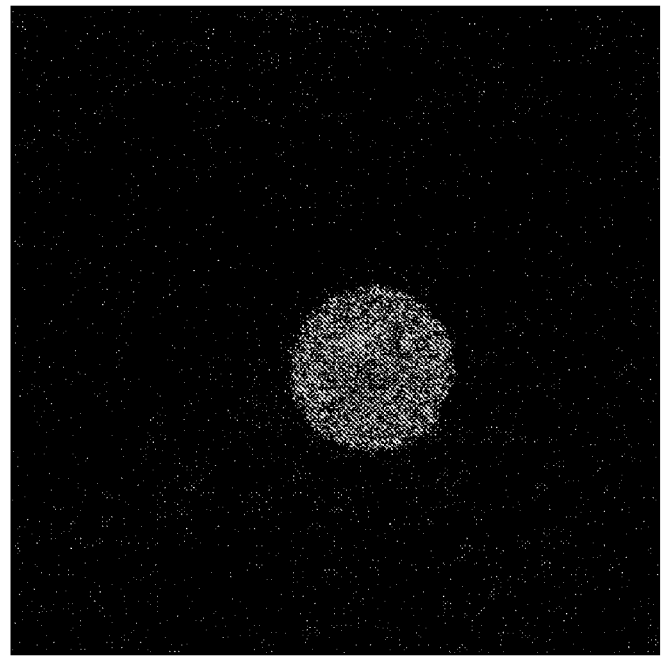
FIGS. 50A and 50B are confocal images of the nano-fibrous PLLA microspheres (NF-MS formulated with 1% (wt/v)) and solid-walled PLLA microspheres (SI-MS) after adsorption of bovine serum albumin (BSA)
Figure 50B:
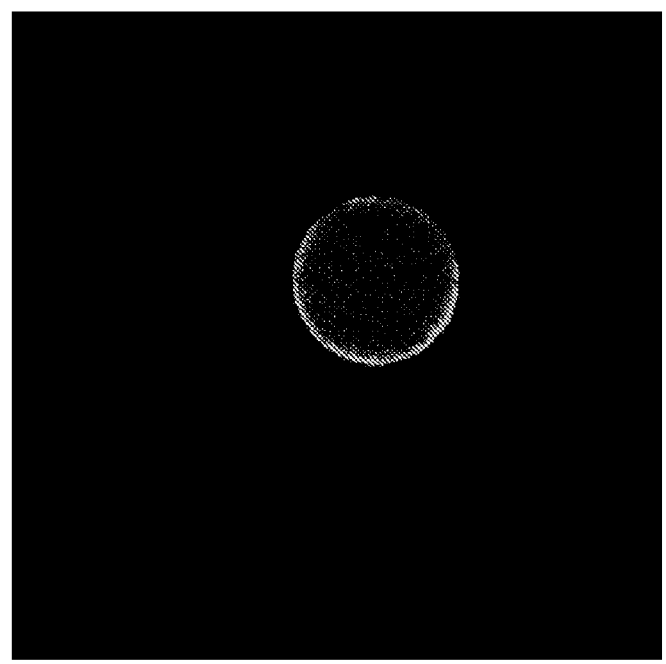

FIGS. 50A and 50B show the confocal images of FITC-labeled BSA adsorbed on both nano-fibrous microspheres of Example 1A and the solid-walled microspheres of the Comparative Example. It was obvious that FITC-labeled BSA was evenly distributed throughout the entire nano-fibrous microspheres, while FITC-labeled BSA was only adsorbed on the surface of solid counterparts.

Figure 51:
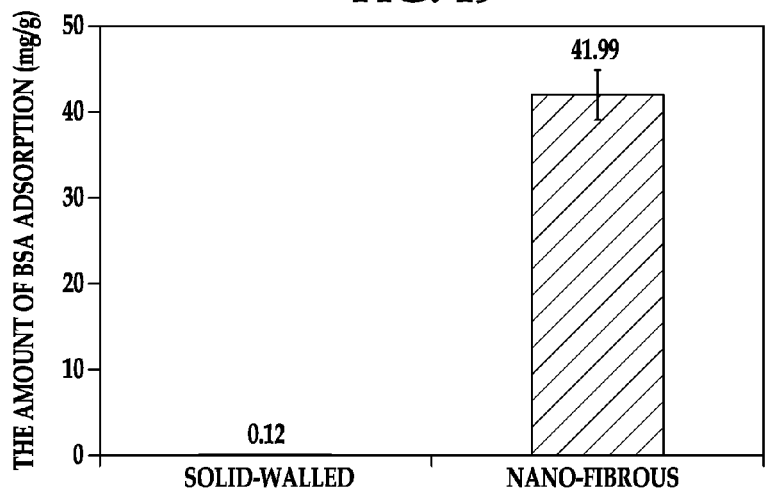
FIG. 51 is a graph illustrating the BSA amounts adsorbed on nano-fibrous PLLA microspheres (NF-MS formulated with 2.0% (wt/v)) and solid-walled PLLA microspheres (SI-MS)
Figure 48A:
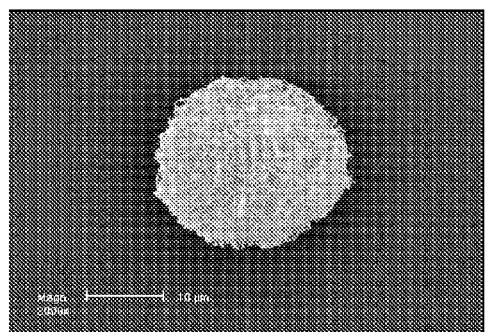
FIGS. 48A through 48H are SEM images of nano-fibrous PLLA microspheres (NF-MS formulated with 1% (wt/v)) and solid-walled PLLA microspheres (SI-MS) after soaking in simulated body fluid for different times, where
Figure 48B:
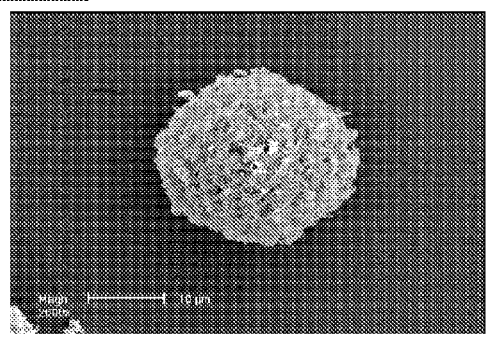
Figure 48C:
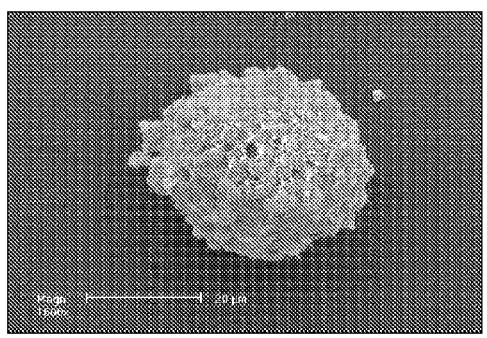
Figure 48D:
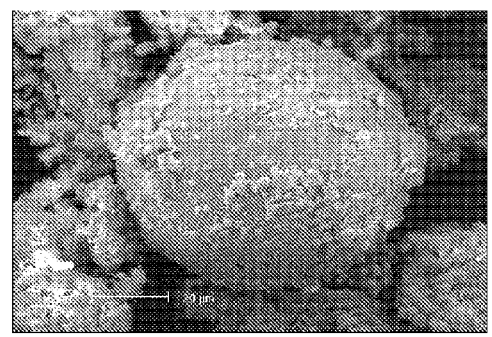
Figure 48E:
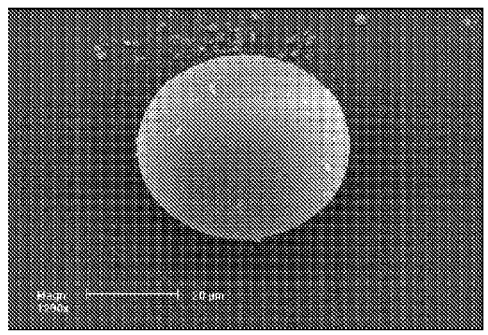
Figure 48F:
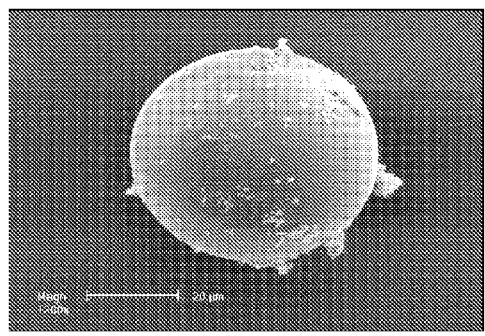
Figure 48G:
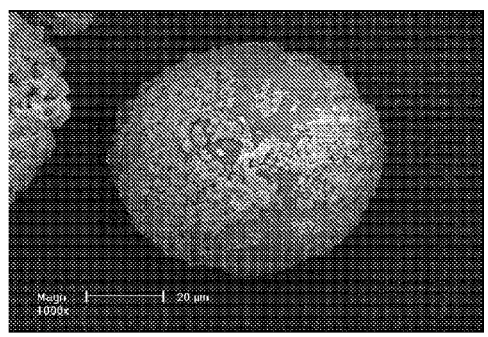
Figure 48H:
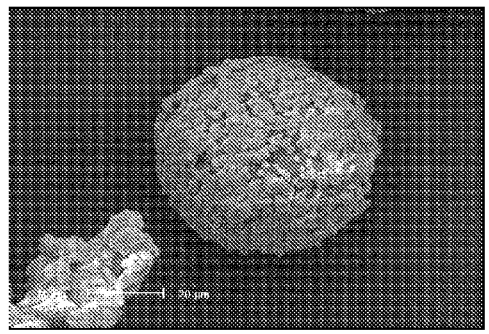
Figure 52:
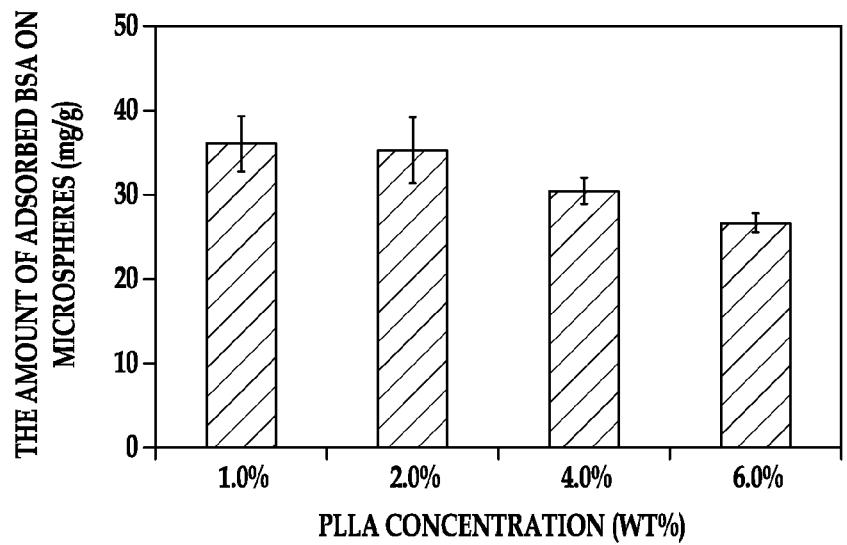
FIG. 52 is a graph illustrating the BSA amounts adsorbed on nano-fibrous PLLA microspheres (NF-MS) formulated with different polymer concentrations.

A protein assay (Micro BCA™) indicated that the amount of BSA adsorbed on the nano-fibrous PLLA microspheres of Example 1 was 41.99 mg/g, while the value on solid-walled PLLA microspheres was 0.12 mg/g (see FIG. 51). Even considering the density difference between the nano-fibrous microspheres and the solid-walled microspheres, the adsorption amount of BSA on nano-fibrous microspheres was about 40 times more than that on solid-walled microspheres when the same volume of spheres were used. The size of the nano-fibrous PLLA microspheres had little effect on BSA adsorption. As shown in FIG. 52, the amount of adsorbed BSA slightly decreased with increasing polymer concentration. Furthermore, the polymer concentration affects the porosity and fiber length (between 2 junctions) as well as the diameter of the microspheres. The differences in porosity and fiber length may account, at least in part, for the changes in the adsorbed protein amount.

Figure 53:
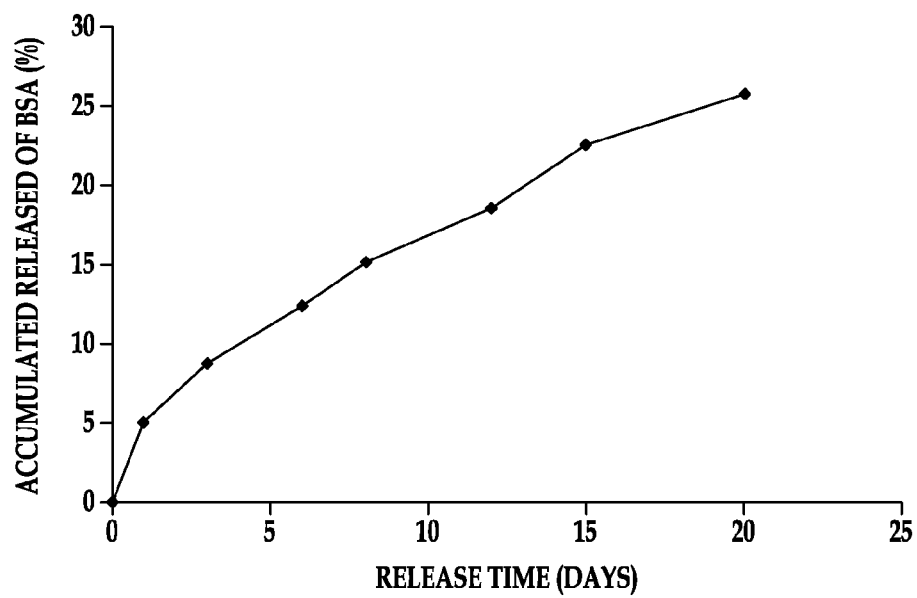
FIG. 53 is a graph illustrating the BSA release profile from nanofibrous PLLA microspheres prepared using a 2.0% (wt/v) PLLA solution.

A BSA release profile from the nano-fibrous PLLA microspheres of Example 1 is shown in FIG. 53. The release profile from the nano-fibrous microspheres was drastically different from that of traditional microspheres fabricated using an established double emulsion technique. There was very low burst release from the nano-fibrous microspheres of Example 1 in the first day. However, sustained long-term release was achieved and BSA was released at an approximately constant rate (after the first day) for the 3 weeks studied. 270.2 µg BSA (about 26% of the total loading) was released in the 3 weeks from 200 mg nanofibrous PLLA microspheres.

Example 5

Effect of Polymer Architecture and Molecular Weight

Synthesis of N,N,N',N'-tetra(2,3-dihydroxypropyl)ethane-1,2-diamine Initiator 2.465 g of glycidol (33.28 mmol) was added dropwise into 0.5 g of ethylenediamine (8.32 mmol) over a period of 0.5 hours at 0° C. The reaction mixture was then stirred for 2 hours at 0° C. The product was collected and used without further purification.

Synthesis of Linear and Star-Shaped PLLA

The typical procedure employed for the preparation of the linear and star-shaped polymers of this example was as follows. This particular description was used for the formation of the linear polymer. 2.7 mg of ethylene glycol ($4.34 \times 10^{-2}$ mmol), 17.6 mg $Sn(Oct)_2$ ($4.34 \times 10^{-2}$ mmol), and 5 g of L-lactide (34.7 mmol) were added to a dried glass ampule equipped with a magnetic stirring bar. After purging six times with dry nitrogen, the ampule was sealed under vacuum, and placed in an oil bath thermostated at 135° C. After 24 hours, the reaction mixture was dissolved in chloroform, and then precipitated into an excess of methanol. After filtration, the dissolution-precipitation cycle was repeated. After drying in a vacuum oven overnight at room temperature, linear PLLA (the samples of which are denoted linear PLLA-1 and linear PLLA-2 hereinbelow) was obtained as a white solid (4.3 g, yield: 86.0%; $M_{n,GPC}$=61.7 kDa, $M_w/M_n$=1.38).

According to similar procedures, star-shaped PLLA was prepared using glycerol, pentaerythritol, N,N,N',N'-tetra(2,3-dihydroxypropyl)ethane-1,2-diamine, and PAMAM dendrimer (G2) as the initiators. These samples are denoted 3-branch PLLA (formed from glycerol), 4-branch PLLA (formed from pentaerythritol), 8-branch PLLA (formed from N,N,N',N'-tetra(2,3-dihydroxypropyl)ethane-1,2-diamine), and 16-branch PLLA (formed from PAMAM dendrimer (G2)). The characterization of the obtained linear and star-shaped polymers is summarized in Table 4.

TABLE 4

| samples[a] | initiator | functional groups | [M]/[I][b] | $M_{n,each}$[c] | $M_{n,GPC}$[d] | $M_w/M_n$[e] |
|---|---|---|---|---|---|---|
| linear PLLA-1 | ethylene glycol | 2 | 300 | 15800 | 27700 | 1.33 |
| linear PLLA-2 | | | 800 | 31100 | 61700 | 1.38 |
| 3-branch PLLA-1 | glycerol | 3 | 450 | 14100 | 37200 | 1.35 |
| 3-branch PLLA-2 | | | 900 | 26400 | 71400 | 1.38 |
| 4-branch PLLA-1 | pentaerythritol | 4 | 400 | 7300 | 21800 | 1.44 |
| 4-branch PLLA-2 | | | 1200 | 16800 | 56600 | 1.50 |
| 4-branch PLLA-3 | | | 1600 | 28500 | 108900 | 1.49 |
| 8-branch PLLA | N,N,N',N'-tetra(2,3-dihydroxpropyl)ethane-1,2-diamine | 8 | 2400 | 13100 | 84100 | 1.41 |
| 16-branch PLLA-1 | PAMAM dendrimer (G2) | 16 | 800 | 3300 | 33400 | 1.34 |
| 16-branch PLLA-2 | | | 3200 | 6700 | 70100 | 1.45 |
| 16-branch PLLA-3 | | | 8000 | 8300 | 98500 | 1.51 |

[a]The polymerization conditions: [Sn(Oct)$_2$]/[LA] = 1/500, at 135° C. for 24 hours.
[b][M]/[I] refers to the ratio of monomer to initiator.
[c]Average molecular weight of each branch estimated by comparison of the integrals of methine protons and the terminal methine in PLLA from $^1$H NMR spectra.
[d,e]Obtained from GPC analysis using polystyrene as standard and THF as eluent.

Synthesis of Microspheres 0.4 g of each of the linear and star-shaped PLLA samples was respectively dissolved in THF at 50° C. with a concentration of 2% w/v. Under rigorous mechanical stirring (speed 9, Fisher Science Inc.), glycerol (50° C.) with three times the volume of the PLLA solution was gradually added into the PLLA solution. After stirring for about 5 minutes, the mixture was poured into liquid nitrogen to induce phase separation for forming nano-fibers. After 10 minutes, 1 L of a water-ice mixture was added for solvent exchange for 24 hours. The spheres were sieved and washed with distilled water 8 times to remove residual glycerol on the sphere surfaces. The spheres were then lyophilized for 3 days. The microspheres formed from the linear PLLA and the different star-shaped PLLA were fabricated under the same conditions (i.e., concentrations, stirring speed, and temperature).

Table 5 sets forth the characterization of the microspheres fabricated in this example.

TABLE 5

| microspheres | surface area (m$^2$/g) | porosity (%) | overall density (g/cm$^3$) | fiber diameter (nm) | fiber length (nm) |
|---|---|---|---|---|---|
| linear PLLA-1 | 1.3 ± 0.2 | 10.1 | 1.071 | / | / |
| linear PLLA-2 | 110.4 ± 1.0 | 90.1 | 0.127 | 169 ± 77 | 2309 ± 541 |
| 3-branch PLLA-1 | 1.9 ± 0.5 | 16.7 | 1.020 | / | / |
| 3-branch PLLA-2 | 109.7 ± 0.9 | 88.3 | 0.150 | 172 ± 48 | 1920 ± 433 |
| 4-branch PLLA-1 | 4.3 ± 1.1 | 25.1 | 0.966 | / | / |
| 4-branch PLLA-2 | 120.8 ± 0.8 | 94.8 | 0.067 | 151 ± 40 | 1715 ± 409 |
| 4-branch PLLA-3 | 112.3 ± 1.4 | 91.9 | 0.104 | 171 ± 91 | 2080 ± 559 |
| 8-branch PLLA | 118.4 ± 1.1 | 95.6 | 0.057 | 149 ± 75 | 2210 ± 328 |
| 16-branch PLLA-1 | 89.5 ± 1.7 | 69.3 | 0.396 | / | / |
| 16-branch PLLA-2 | 120.8 ± 1.3 | 95.2 | 0.062 | 143 ± 60 | 1520 ± 355 |
| 16-branch PLLA-3 | 121.7 ± 2.0 | 95.7 | 0.059 | 144 ± 44 | 1630 ± 391 |

Effect of Architecture on Structure of Microspheres

As shown in Table 4 above, some of the microspheres were formed using linear and star-shaped PLLA with comparable molecular weights. For example, the molecular weight of linear PLLA-2, 3-branch PLLA-2, 4-branch PLLA-2, 8-branch PLLA, and 16-branch PLLA-2 were all in the range of 50 kDa to 70 kDa. The morphologies of the microspheres obtained using these polymers are shown in FIGS. 54A through 54E, respectively. All of these microsphere samples contained nano-fibers and had high surface areas (>110 m$^2$/g) and porosities (>90%) (see Table 5). As shown in Table 5, the average fiber diameters of nano-fibrous microspheres made from linear PLLA-2 and 3-branch PLLA-2 were larger than those made from 4-branch PLLA-2, 8-branch PLLA, and 16-branch PLLA-2. The average fiber lengths of these microspheres are all in the range of 1.5 μm to 2.5 μm.

Figures 54A, 54B, 54C, 54D, 54E:
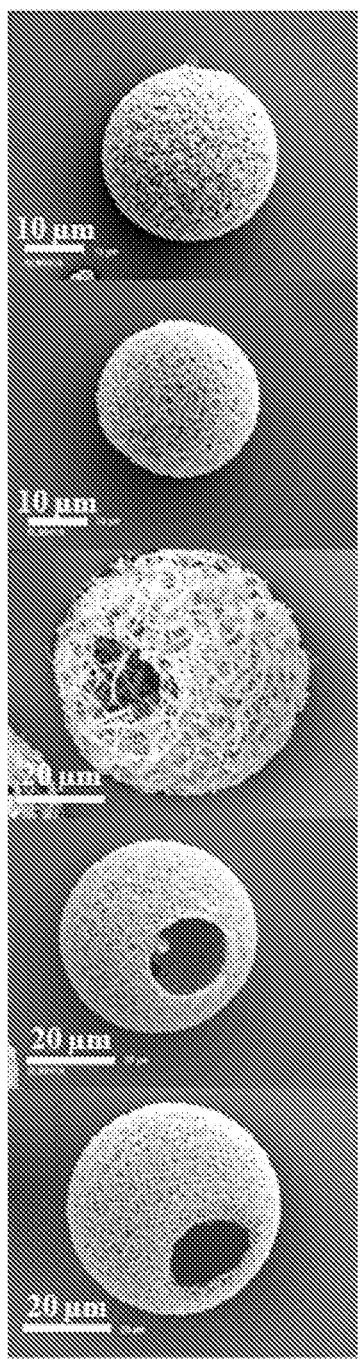
FIGS. 54A through 54E are SEM images of nano-fibrous microspheres fabricated, respectively, from linear PLLA, 3-branch PLLA, 4-branch PLLA, 8-branch PLLA, and 16 branch PLLA, at a concentration of 2% w/v.

Nano-fibrous microspheres without hollow cores were prepared from linear PLLA-2 and 3-branch PLLA-2 (see FIGS. 54A and 54B). When the branch numbers of the star-shaped polymers were higher than three, hollow structures with a hollow core (or multiple cores) and a hole (or multiple holes) on the shells of the microspheres were generated (see FIGS. 54C through 54E). The nano-fibrous microspheres made from 4-branch PLLA-2 possessed small hollow spaces within the cores and small open holes on the surfaces. The average diameter of the whole 4-branch PLLA-2 microsphere was 35±14 μm, and the average diameter of the hollow spaces was estimated to be about 10 μm (FIG. 54C). For the nano-fibrous microspheres fabricated from 8-branch PLLA and 16-branch PLLA-2, the shells were much thinner than those made from 4-branch PLLA-2 (compare FIGS. 54D and 54E with FIG. 54C). As illustrated in these figures, a higher branch number favors hollow structure formation. Because of the nano-fibrous and hollow structure, the NF-HMS fabricated from 4-branch PLLA-2, 8-branch PLLA, and 16-branch PLLA-2 had an overall density of 0.067, 0.057, and 0.062 g/cm$^3$, respectively, which are ½ of the density of the NF-MS fabricated from linear PLLA-2 and 3-branch PLLA-2 (see again Table 5).

Without being bound to any theory, it is believed that the formation of the hollow core(s) within the microspheres and open hole(s) on the surface of the microspheres are attributed to the emulsification process of THF solutions in glycerol and the defective structures of the star-shaped polymers. In the process of emulsification, with glycerol gradually added into the THF solution of star-shaped PLLA, a little glycerol was still encapsulated within the cores of microspheres after the phase inversion. It is believed that the un-reacted hydroxyls surround and stabilize the encapsulated glycerol in the phase inversion process. It is also believed that the un-reacted hydroxyls surrounding the interface of THF and encapsulated glycerol led to the open holes on the surface of the microspheres during the thermally induced phase separation process, which produced the nano-fibrous structure. After the extraction of glycerol, the hollow structure was obtained.

While the $^1$H NMR data is not reproduced herein, un-reacted hydroxyls were not observed on the initiators used to form the 4-branch PLLA-2 and 8-branch PLLA polymers. Microspheres prepared from 4-branch PLLA-2 and 8-branch PLLA did contain cores and open holes on the surfaces. In the process of polymerization to synthesize 4-branch PLLA-2 and 8-branch PLLA, four hydroxyls of pentaerythritol and eight hydroxyls of N,N,N',N'-tetra(2,3-dihydroxpropyl) ethane-1,2-diamine all initiated the ring open polymerization of L-lactide at the initial stage of the polymerization. For these samples, the steric hindrance increased with the polymer chains propagating, and thus only part of the branches continued to grow. This resulted in defective structures with long and short branches on a single molecule. It is believed that in the preparation of NF-HMS using 4-branch PLLA-2 and 8-branch PLLA via emulsification and thermally induced phase separation, the hydroxyls on the shorter arms could function as the stabilizer to surround the glycerol encapsulated in the microspheres. On the other hand, non-hollow nano-fibrous microspheres were formed when linear PLLA-2 and 3-arm PLLA-2 were used to prepare microspheres via emulsification and thermally induced phase separation. This is due to the fact that there is not a pronounced structural defect on the molecular chains of linear PLLA-2 and 3-branch PLLA-2 as compared with 4-branch PLLA-2, 8-branch PLLA, and 16-branch PLLA-2. Thus, in some instances when forming the hollow microstructures disclosed herein, it is desirable to utilize star-shaped polymers with structural defects and hydroxyls in the center which can function as the stabilizer to surround the encapsulated glycerol effectively.

Effect of Molecular Weight on Structure of Microspheres

Also as shown in Table 4 above, some of the microspheres were formed using linear and star-shaped PLLA with variable molecular weights. This was accomplished to determine the influence of molecular weight on the self-assembled morphologies of the final microspheres.

When the linear PLLA-1 and 3-branch PLLA-1 with smaller molecular weights (i.e., less than 40 kDa) were used, the microspheres obtained did not contain nano-fibers or hollow cores. These particular microspheres possessed much smaller surface areas and porosities and much higher overall densities when compared with NF-MS fabricated from the linear PLLA-1 and 3-branch PLLA-1 (those described in Tables 4 and 5). However, as previously mentioned, it is believed that smaller molecular weight polymers can result in the formation of at least nano-fibers when other conditions are varied.

The 4-branch PLLA with varying molecular weights was selected to investigate the influence of molecular weight on the final morphologies, in part because 4-branch PLLA-2 with MW 56.6 kDa formed a small hollow core and a small open hole on the surface. FIGS. 55A through 55D show the morphologies of the microspheres fabricated from 4-branch PLLA-1 and 4-branch PLLA-3 with molecular weights of 21.8 kDa and 108.9 kDa, respectively. The microspheres formed from 4-branch PLLA-1 are shown in FIGS. 55A and 55B. These images clearly show multiple irregular holes on the surface. Within the cores of these spheres, irregular multiple hollow spaces were formed (which can be observed from the broken spheres in FIG. 55A). As shown in FIG. 55B, while nano-fibers were formed, it is noted that the microspheres made from 4-branch PLLA-1 with the lower molecular weight did not form as good of nano-fibrous structures as some of the other polymers used. This further supports the contention that nano-fibrous structures are obtained from the polymers with higher molecular weights via thermally induced phase separation. As shown in FIGS. 55C and 55D, higher molecular weight polymers favored the formation of non-hollow nano-fibrous spheres over hollow nano-fibrous spheres.

In addition, the star-shaped 16-branch PLLA with different molecular weights (33.4 kDa and 98.5 kDa) were also used to fabricate nano-fibrous microspheres. The microspheres fabricated from 16-branch PLLA-1 contain multiple hollow structures, as shown in FIGS. 56A and 56B. When 16-branch PLLA-3 with higher molecular weight was used, similar structures and characteristics (surface area, porosity, and overall density) to those made from 16-branch PLLA-2 were obtained (see Tables 4 and 5).

In the body, the extracellular matrix is a natural web of nanoscale structures and serves an important role in the maintenance of cell and tissue structure and function. As an artificial extracellular matrix, a good scaffolding material should mimic the advantageous features of the natural extracellular matrix. The nano-fibrous microspheres 10, 10' disclosed herein mimic the structural feature of natural collagen fibers (a main component of natural extracellular matrix) at the nanometer scale.

While several embodiments have been described in detail, it will be apparent to those skilled in the art that the disclosed embodiments may be modified. Therefore, the foregoing description is to be considered non-limiting.

What is claimed is:
1. A nano-fibrous microsphere, comprising:
a plurality of nano-fibers aggregated together in a spherical shape to form a shell of the microsphere, the nano-fibers formed of a star-shaped polymer including:
a multi-functional molecule having at least three branches; and
an oligomer or a polymer chain initiated from or coupled to the at least three branches of the multi-functional molecule;
a plurality of pores formed between at least some of the plurality of nano-fibers;

one hollow core formed in a center of the microsphere, the one hollow core being surrounded by the plurality of nano-fibers; and a dispersing medium present in the one hollow core wherein the diameter of the microsphere ranges from about 10 μm to about 180 μm.

2. The microsphere as defined in claim 1 wherein each of the plurality of nano-fibers has a diameter ranging from about 50 nm to about 500 nm.

3. The microsphere as defined in claim 1 wherein the polymer chains are polymerized from or coupled to the at least three branches of the multi-functional molecule, and wherein the polymer chains are selected from the group consisting of poly(L-lactic acid), modified poly(L-lactic acid), polycaprolactone, polyamides, polyacrylonitrile, and gelatin.

4. The microsphere as defined in claim 1 wherein a molecular weight of the star-shaped polymer is equal to or greater than 10 kDa.

5. The microsphere as defined in claim 1 wherein the dispersing medium is glycerol.

6. A method for making the nano-fibrous microsphere as defined in claim 1, comprising:
dissolving the star-shaped polymer in a solvent to form a solution;
adding a dispersing medium to the solution to form an emulsion;
thermally inducing phase separation of the emulsion to form nano-fibers;
extracting the dispersing medium; and
lyophilizing the nano-fibers to form the nano-fibrous microsphere.

7. The method as defined in claim 6 wherein the nano-fibrous microsphere is hollow, and wherein the method is performed in the absence of a template.

8. The method as defined in claim 6 wherein the solvent is tetrahydrofuran, and wherein the dispersing medium is glycerol.

9. The method as defined in claim 6 wherein thermally inducing phase separation is accomplished by quenching the emulsion in a sufficiently cold medium.

10. The method as defined in claim 6 wherein extracting the dispersing medium is accomplished via a solvent exchange with a non-solvent of the polymer.

11. The method as defined in claim 6 wherein the formation of the emulsion takes place in the absence of a surfactant.

12. The method as defined in claim 6, further comprising:
adding a template to the solution;
wherein during the thermally induced phase separation, the nano-fibers form around the template such that the template acts as a mold for a hollow core; and
leaching the template, thereby exposing the hollow core.

* * * * *